(12) United States Patent
Batchelder et al.

(10) Patent No.: US 6,238,613 B1
(45) Date of Patent: May 29, 2001

(54) APPARATUS AND METHOD FOR THERMOPLASTIC EXTRUSION

(75) Inventors: John Samuel Batchelder, Somers, NY (US); Robert L. Zinniel, Plymouth, MN (US)

(73) Assignee: Stratasys, Inc., Eden Prairie, MN (US)

( * ) Notice: Subject to any disclaimer, the term of this patent is extended or adjusted under 35 U.S.C. 154(b) by 0 days.

(21) Appl. No.: 09/352,081

(22) Filed: Jul. 14, 1999

(51) Int. Cl.⁷ .............................. B29C 41/02; B29C 47/86
(52) U.S. Cl. .............................. 264/404; 137/13; 264/308
(58) Field of Search .................................. 264/308, 404; 137/13

(56) References Cited

U.S. PATENT DOCUMENTS

| 2,742,669 | * | 4/1956 | Rhodes | 264/404 |
|---|---|---|---|---|
| 4,082,109 | | 4/1978 | Sun et al. | 137/340 |
| 4,269,212 | | 5/1981 | Kaartinen | 137/13 |
| 4,396,031 | | 8/1983 | Peterson et al. | 137/13 |
| 4,460,398 | | 7/1984 | Sasaki | 65/327 |
| 4,623,307 | * | 11/1986 | Froeschke | 425/8 |
| 4,778,642 | | 10/1988 | Lee et al. | 264/510 |
| 4,922,082 | | 5/1990 | Bredt et al. | 219/541 |
| 4,989,626 | | 2/1991 | Takagi et al. | 137/13 |
| 5,101,848 | | 4/1992 | Kojima et al. | 137/13 |
| 5,121,329 | | 6/1992 | Crump | 364/468 |
| 5,136,515 | | 8/1992 | Helinski | 364/468 |
| 5,311,896 | | 5/1994 | Kaartinen | 137/15 |
| 5,320,250 | | 6/1994 | La et al. | 222/1 |
| 5,344,298 | | 9/1994 | Hull | 425/135 |
| 5,406,969 | | 4/1995 | Gray et al. | 137/13 |
| 5,764,521 | | 6/1998 | Batchelder et al. | 364/475.01 |
| 5,855,836 | | 1/1999 | Leyden et al. | 264/401 |
| 5,988,197 | | 11/1999 | Colin et al. | 137/13 |

* cited by examiner

Primary Examiner—Leo B. Tentoni
(74) Attorney, Agent, or Firm—Kinney & Lange, P.A.

(57) ABSTRACT

An electrically operated apparatus and method for altering the flow resistance experienced by a thermoplastic passing through a flow channel using one or more thermal valves having a short response time is described. The extrudate configuration of thermoplastic emerging from one or more extrusion orifices is alterable by selectively opening one or more of thermal valves that supply thermoplastic to the one or more extrusion orifices. Each thermal valve is cooled by a heat sink and has an associated heater responsive to control signals. Each heater is independently activated in synchronization with movement of the apparatus in a predetermined spatial pattern with respect to a base. By extruding thermoplastic onto a base layer-by-layer in this manner, a three-dimensional object may be formed.

9 Claims, 20 Drawing Sheets

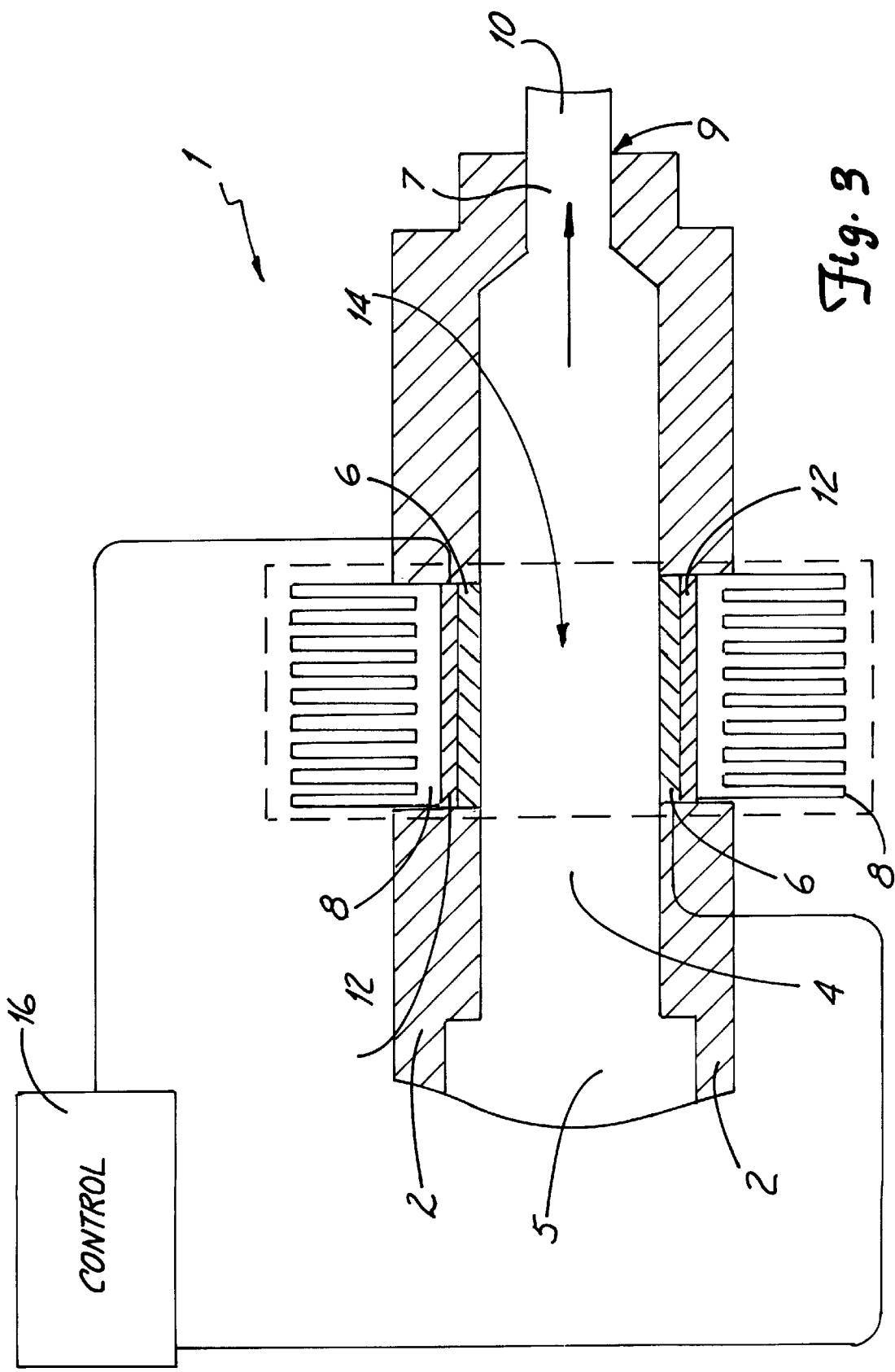

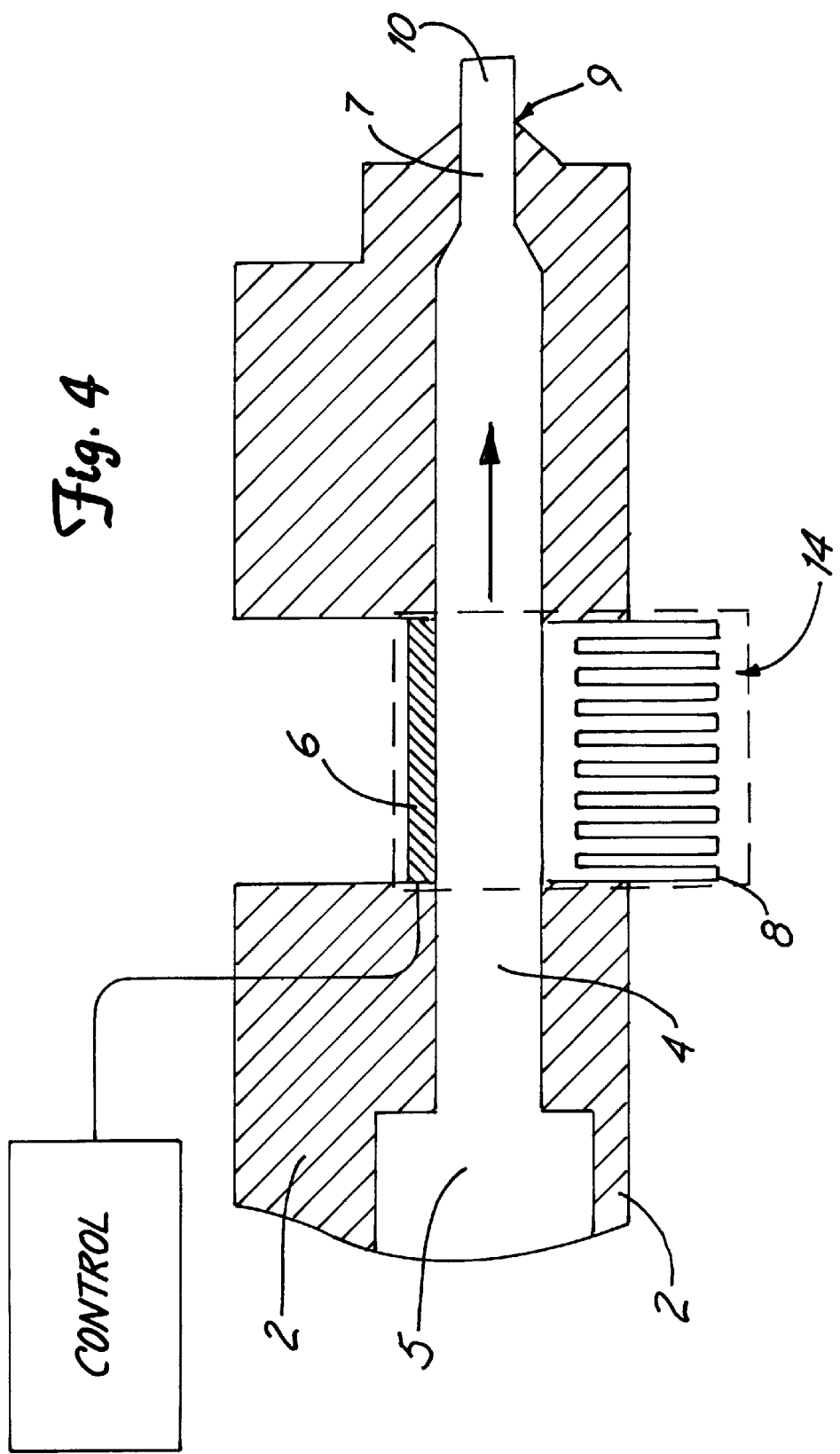

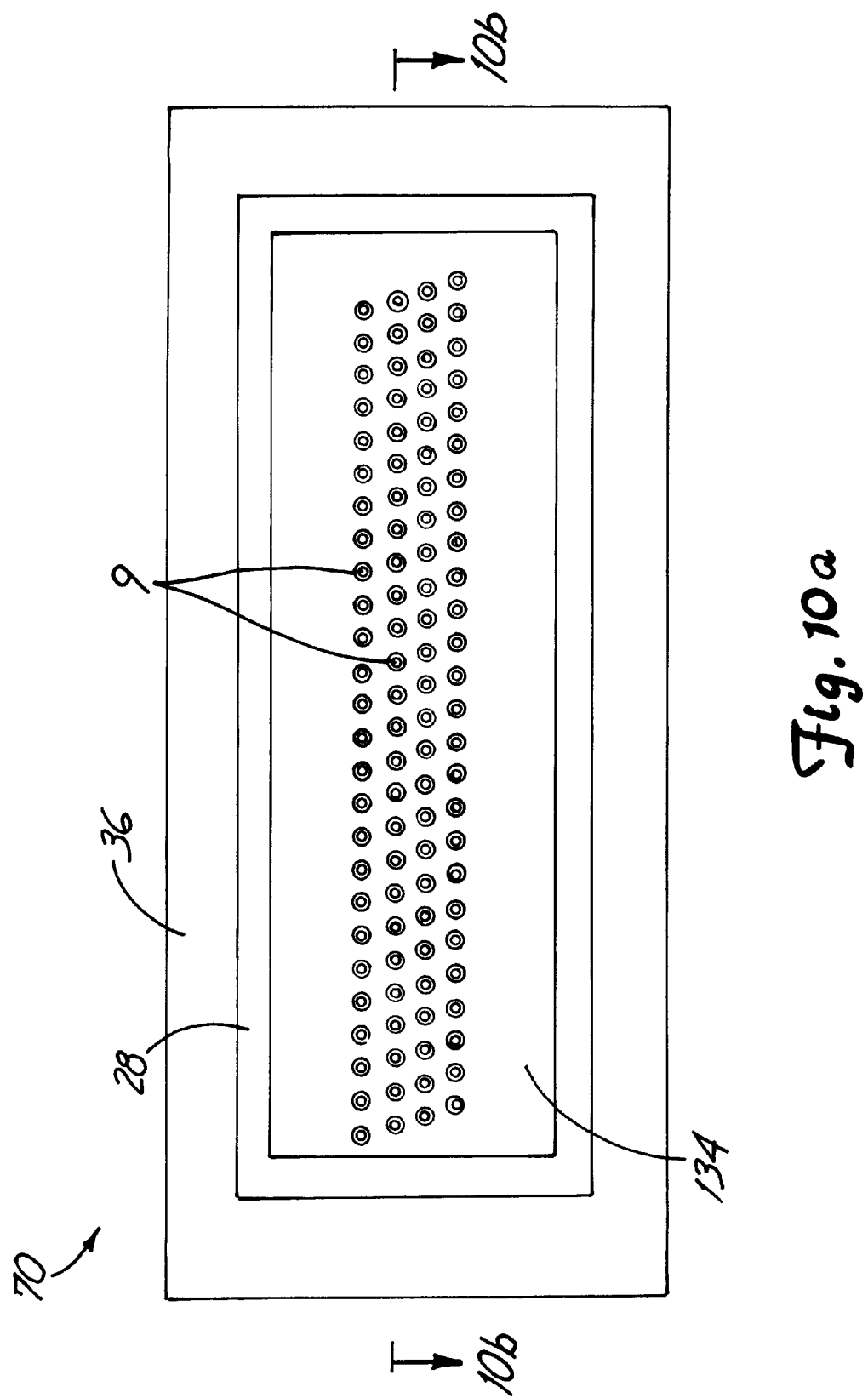

APPARATUS AND METHOD FOR THERMOPLASTIC EXTRUSION

CROSS-REFERENCE TO RELATED APPLICATION(S)

None

BACKGROUND OF THE INVENTION

This invention relates to thermoplastic extrusion technologies. More particularly, this invention relates to extrusion of thermoplastic in a predetermined spatial pattern under computer control.

Thermoplastic extrusion technologies perform rapid prototyping of three-dimensional objects by selectively extruding a molten thermoplastic from an extrusion head while moving the extrusion head in three dimensions with respect to a base. The thermoplastic is extruded in "beads" or "roads" that solidify after being deposited. Movement of the extrusion head with respect to the base is performed under computer control, in accordance with design data provided from a computer aided design (CAD) system. U.S. Pat. Nos. 5,121,329 and 5,764,521, commonly assigned to Stratasys, Inc., the assignee of the present invention, describe the rapid prototyping deposition modeling technology and are hereby incorporated by reference as if set forth fully herein.

In existing thermoplastic extrusion technologies, the configuration of the extrudate is adjustable in quantity and flow rate but not in spatial configuration. The flow rate of material out of an orifice is carefully controlled, but the spatial configuration (e.g., road width) of the flow is not readily alterable.

As the size of the element of additive material shrinks, a prototype part built with those additive elements will typically represent its CAD model parent with greater fidelity. For example, depositing layers of thermoplastic half as thick using extruded roads that are half as wide will improve the feature detail and surface finish of a model by about a factor of two. Unfortunately, with a constant deposition velocity, the time to build the model with this factor of two increase in resolution increases by about a factor of eight.

This speed/resolution conflict has been resolved in other rapid prototyping technologies by replacing vector motion of a single source with raster motion of multiple ink jets. An example is the Actua™ ink jet rapid prototyping system from 3D Systems, Inc., which forms three-dimensional models from a wax-like material. The ink jets are individually controlled so that any number of the jets will deposit the modeling material at a given time. Ink jet-based technologies are attractive for extruding discrete quantities of relatively low viscosity materials, however, ink jetting techniques have difficulty with high viscosity materials (such as thermoplastics) and particulate or fiber-filled materials. These materials tend to clog the jets. Also, in thermoplastic extrusion, "wetting" of the base by the extruded thermoplastic serves to separate the thermoplastic from the extrusion head, while ink-jetted materials break free due to the jetting momentum.

There is an unmet need for a computer-controlled extrusion apparatus suitable for dispensing thermoplastic in an extrudate configuration that may be varied quickly during deposition, in accordance with movement of the apparatus in a predetermined spatial pattern relative to a base.

BRIEF SUMMARY OF THE INVENTION

Thermoplastic is extruded in a varying extrudate configuration in synchronization with movement of a dispensing apparatus in a predetermined spatial pattern with respect to a base, by using the temperature dependent properties of the thermoplastic to valve the thermoplastic flow. A heat sink cools a valve region of a flow channel within the apparatus to a temperature below the lowest flowable temperature of the thermoplastic. A heater thermally contacting the valve region creates a thermal valve. The heater is capable of receiving heat generation signals from a control so as to selectively generate heat. A flow of thermoplastic provided to the flow channel is selectively allowed to flow through the thermal valve for extrusion in a varying extrudate configuration, by selectively heating the valve region to a temperature at which the thermoplastic is flowable in accordance with movement in the predetermined spatial pattern. A second thermal valve is optionally created by placing a second, independently controlled heater in a second valve region along the flow channel. The second thermal valve may be used to vary the pressure of the thermoplastic extrudate.

In an alternative embodiment, multiple thermal valves are integrated into compact arrays within an extrusion head of the present invention, to provide a varying extrudate configuration and high speed extrusion. The heaters associated with the various thermal valves in the array are selectively and independently controlled in accordance with the predetermined spatial pattern.

BRIEF DESCRIPTION OF THE DRAWINGS

FIG. 1b is a sectional view of the first embodiment of a thermal valve, as seen from a line 1b—1b of FIG. 1a.

FIG. 3 is a sectional view of the thermoplastic extrusion apparatus of the present invention, utilizing a second embodiment of a thermal valve.

FIG. 4 is a sectional view of the thermoplastic extrusion apparatus of the present invention, utilizing a third embodiment of a thermal valve.

FIG. 5b is a sectional view of the fourth embodiment of a thermal valve of the present invention, as seen from a line 5b—5b of FIG. 5a.

FIG. 6b is a sectional view of the extrusion head of FIG. 6a, taken along a line 6b—6b of FIG. 6a.

FIG. 6c is a sectional view of the extrusion head of FIG. 6a, taken along a line 6c—6c of FIG. 6a.

FIG. 10a is an exterior view of the bottom of an extrusion head according to the present invention.

FIG. 10b is a partial sectional view of the extrusion head of FIG. 10a, as seen from a line 10b—10b of FIG. 10a.

FIG. 12b is a sectional view of the extrusion head and thermoplastic source of FIG. 12a, as seen from a line 12b—12b of FIG. 12a.

FIG. 12c is a sectional view of the extrusion head and thermoplastic source of FIG. 12a, as seen from a line 12c—12c of FIG. 12a.

DETAILED DESCRIPTION

Figure 1A:
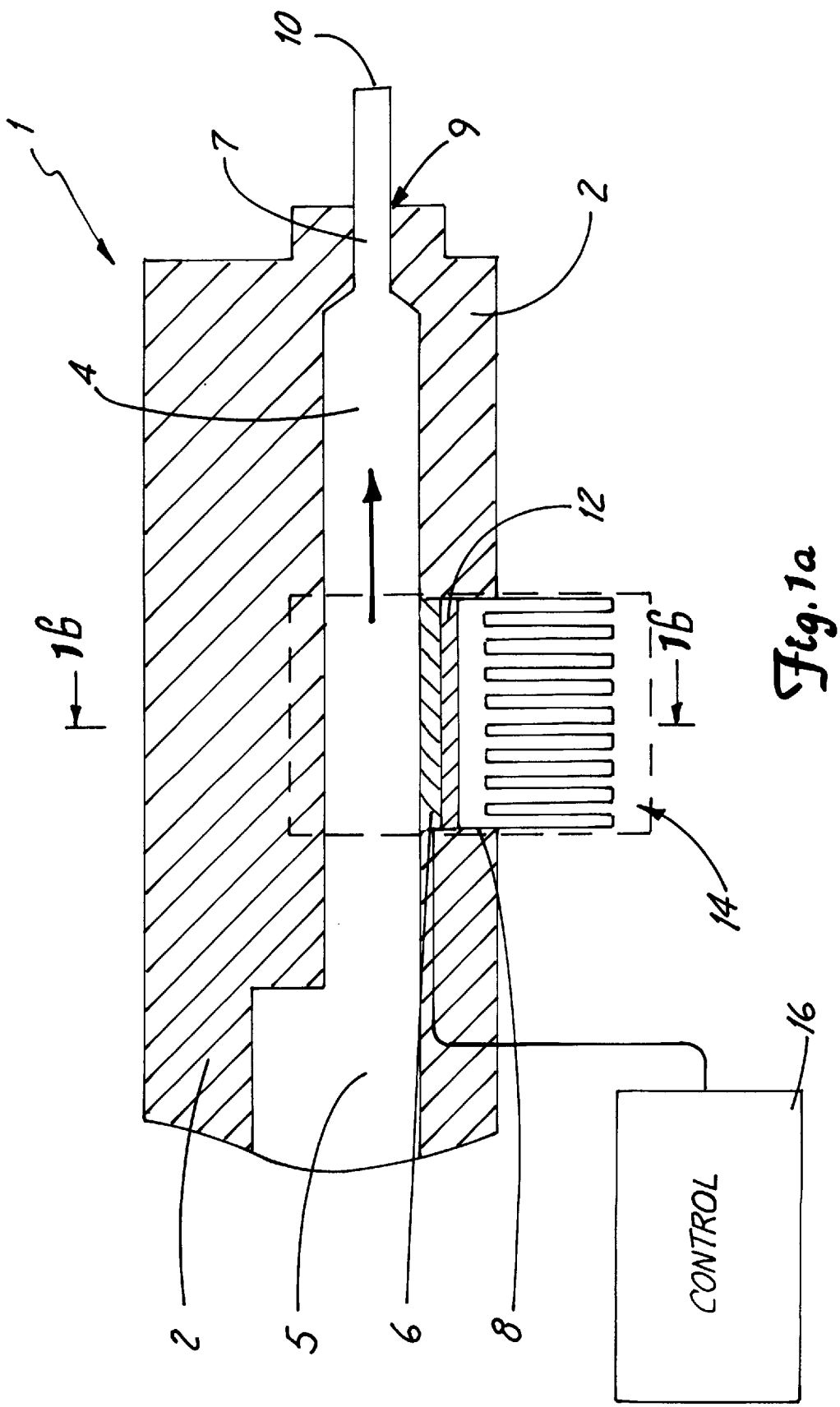
FIG. 1a is a sectional view of a thermoplastic extrusion apparatus of the present invention utilizing a first embodiment of a thermal valve.

The present invention alters the flow resistance of a channel using a thermal valve technique. The temperature dependant viscosity and elasticity of a flowable thermoplastic allows the channel to be valved on and valved off by controlling temperature in the channel. The present invention is explained in detail below with reference to various embodiments. In the explanation of the various embodiments, the same reference numerals are used where appropriate to denote the same functional elements. Use of the same reference numerals in the various embodiments is done for convenience, and it is not intended to limit the present invention to any specific embodiment.

Figure 1B:
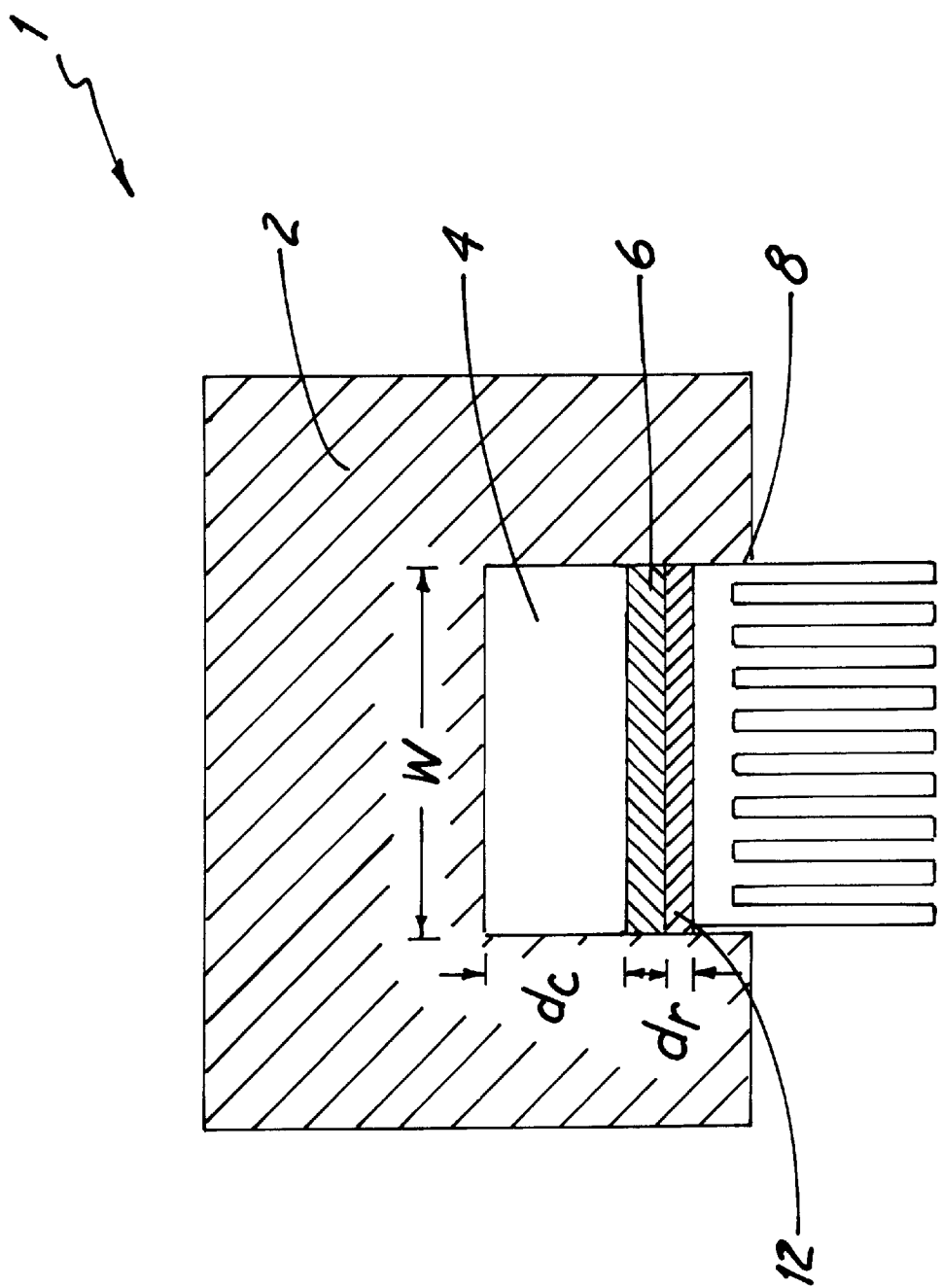

A thermoplastic extrusion apparatus according to the present invention showing a first embodiment of a thermal valve is illustrated in FIGS. 1a and 1b. The thermoplastic extrusion apparatus 1 is comprised of a body 2 having a flow channel 4. A plenum 5 is flowably connected to an inlet end of flow channel 4, and an outlet end of flow channel 4 forms a nozzle 7 having an orifice 9. The plenum 5 connects a source of flowable thermoplastic with the flow channel 4. Flowable thermoplastic under pressure flows in the direction of the arrow from plenum 5 through flow channel 4. The cross sectional area for flow in the plenum is preferably greater than the cross sectional area for flow in the flow channel, to maintain a steady flow pressure in the channel. The thermoplastic emerges from orifice 9 having an extrudate configuration 10.

At a selected position along flow channel 4 are a heater 6, a heat sink 8 and a thermal resistor 12, which together with the adjacent region of flow channel 4 that is thermal contact with heater 6 and heat sink 8 (i.e., the "valve region"), form a thermal valve 14. Heater 6 is controlled by electrical signals received from a control 16, to selectively generate heat. The heater 6 may be a standard surface mount resistor (SMT), comprised of, for example, carbon, gallium arsenide, germanium, molybdenum, platinum, ruthenium, oxide, silicon or tungsten; or it may be another of numerous known selectively heat producing elements, for example, a diode, a spark gap or a transistor. In the embodiment shown, the heater 6 forms a portion of the flow channel 4, but alternatively a conductive channel wall member may separate heater 6 from channel 4. Where heater 6 forms a portion of the flow channel, heater 6 optionally has a protective layer isolating it from the flow channel 4 to inhibit corrosion and maintain smooth channel walls.

The heat sink 8 functions to remove heat generated by heater 6. The heat sink 8, shown as a fin-type heat sink, is maintained at a temperature below the lowest flowable temperature of the thermoplastic. The heat sink may be maintained at a desired low temperature using a flowing thermal fluid, such as water (shown in FIGS. 6a and 6b), or using any other active cooling technique known to those skilled in the art, such as air cooling, thermoelectric cooling, refrigeration or conduction cooling. Passive cooling may alternatively be used, if the ambient air temperature is sufficiently low. The heater 6 and the heat sink 8 are thermal conductors.

Thermal resistor 12 is comprised of thermally resistive material, for example, ceramic, epoxy, graphite, Kapton, silicon, silicone or Teflon, which material provides a thermal resistance between the heat sink 8 and the heater 6. In this embodiment, the heat sink 8 thermally contacts the flow channel 4 through the heater 6.

In the absence of heat generated by the heater 6, the thermoplastic in the valve region is not flowable, and the flow channel 4 is said to be closed or valved off (i.e., thermal valve 14 is closed). As heater 6 provides an increasing amount of heat, the temperature drop across the thermal resistor 12 increases with the heat flow from the heater 6 to the heat sink 8; the temperature of the thermoplastic in the valve region rises, and the resistance to flow of the thermoplastic material in the valve region drops. When the heat produced by the heater 6 times the thermal resistance of the thermal resistor 12 equals the temperature difference between the lowest flowable temperature of the thermoplastic and the temperature of the heat sink 8, the flow channel 4 is unobstructed in the valve region (i.e., thermal valve 14 is open), and the flow channel is said to be open or valved on.

The orifice 9 is an aperture, slot, or pinhole or the like that marks the transition from the flow channel 4 to the external environment of the extrusion apparatus 1. In rapid prototyping applications, the external environment is a chamber in which prototypes are built and in which a robot moves an extrusion head carrying an extrusion apparatus of the present invention in a predetermined spatial pattern with respect to a three-dimensional object being built. Rapid prototyping systems to which the present invention is applicable are disclosed, for example, in U.S. Pat. No. 5,121,329 and U.S. Pat. No. 5,764,521, assigned to Stratasys, Inc., which are hereby incorporated by reference.

The extrudate configuration 10 refers to the spatial configuration (e.g., cross-sectional dimensions) and temporal character (e.g., flow rate) of the thermoplastic extrudate that emerges from the orifice 9.

The temporal extrudate configuration varies as a function of the amount of heat released by heater 6. In other words, the rate that thermoplastic is extruded from the nozzle 7 at a given time is dependent on the amount of heat produced by the heater 6. Multiple thermal valves may be arranged in a series along a flow channel, in parallel to valve multiple flow channels, or a combination thereof to further vary the temporal extrudate configuration.

The spatial extrudate configuration may be varied using an array of thermal valves 14 arranged in parallel (e.g., embodiments described below). Likewise, a single thermal valve 14, such as the embodiment shown in FIGS. 1a and 1b, can be implemented to vary the spatial extrudate configuration by placing the thermal valve at a position contiguous with orifice 9. While a thermal valve generally is referred to herein in a binary sense of being open or closed, it is clear that the valve can have intermediate states. A thermal valve is made relatively more open (decreasing its flow resistance) by increasing the heat released by the heater 6, and is made relatively more closed (increasing its flow resistance) by decreasing the heat released by the heater 6. When thermoplastic adjacent the heater 6 is relatively warmer and thermoplastic adjacent the heat sink 8 is relatively colder, flow adjacent the heater 6 is constrained to a reduced cross section. With the thermal valve located at orifice 9, the spatial extrudate configuration at a given time is dependent on the amount of heat produced by the heater 6.

A thermal valve of the present invention may also be used to reduce the response time of a liquifier used in thermoplastic extrusion. It is known in the art that the response time of a liquifier having a pressure-controlled thermoplastic flow (i.e., time for a change of pressure at the orifice following a change in thermoplastic feed pressure) increases with liquifier length. Similarly, the maximum thermoplastic flow rate increases with liquifier length as well. It is desirable in rapid prototyping applications to simultaneously reduce liquifier response time while increasing the flow rate. Short response times allow an extrusion head to accelerate quickly, and large flow rates allow the extrusion head to move at a high velocity. Both are important for rapidly creating prototypes. Adding a thermal valve near the orifice of a liquifier reduces response time independent of liquifier length.

EXAMPLE 1

An example is provided of the thermal power required to open a single thermal valve of the embodiment shown in FIGS. 1a and 1b. In this example, we assume the following: the thermoplastic is ABS (acrylonitrile butadiene styrene); the width of flow channel 4 is W=40 mils (0.040 inches) wide; the height of flow channel 4, which is the characteristic cross-sectional dimension for heat flow in this configuration, is $d_c$=5 mils high; the heater 6 is a ruthenium oxide film on an alumina substrate (a standard surface mount (SMT) resistor); the heat sink 8 is copper held at 80° C.; and the thermal resistor 12 is formed of a Kapton film having a thickness $d_r$=1 mil thick and a length L=60 mils long along the flow direction. We take the lowest flowable temperature of ABS to be 220° C. and the highest non-flowable temperature of ABS to be 110° C. Between these two temperatures ABS exhibits creep flow. The thermal conductivity of Kapton is $k_{kapton}$=0.14 Watts/(meter ° C.), and the thermal resistance of the thermal resistor 12 is calculated as R=$d_r$/($k_{kapton}$LW)=117° C./Watt. The thermal power that needs to be produced by the heater 6 to open the thermal valve is then (220°−80°)/R=1.2 Watts in steady state.

EXAMPLE 2

Figure 2A:
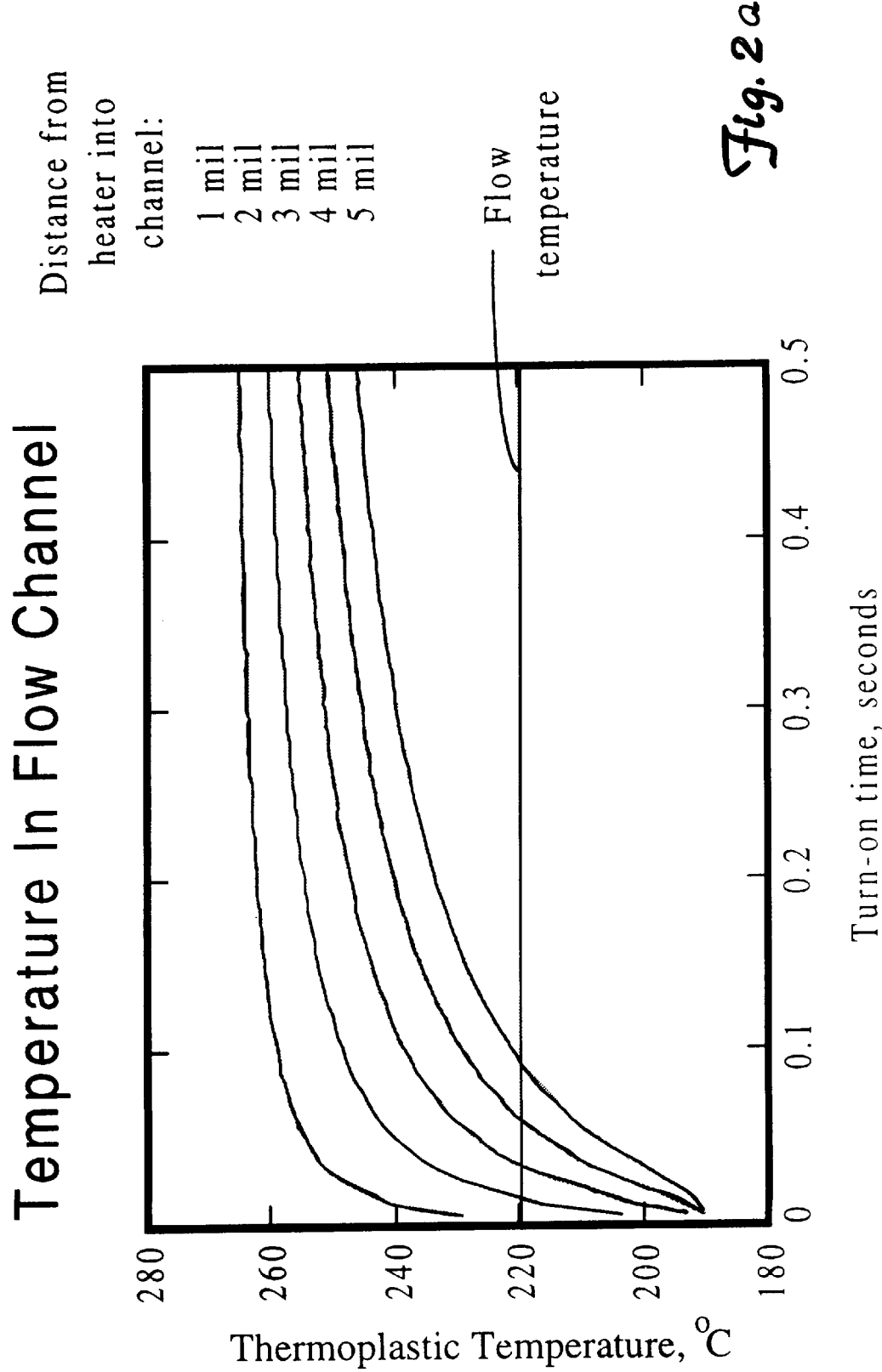
FIG. 2a is a graphic representation of the temperature profile in the flow channel of a thermoplastic extrusion apparatus according to the first thermal valve embodiment, with the heater turned on at t=0 seconds.
Figure 2B:
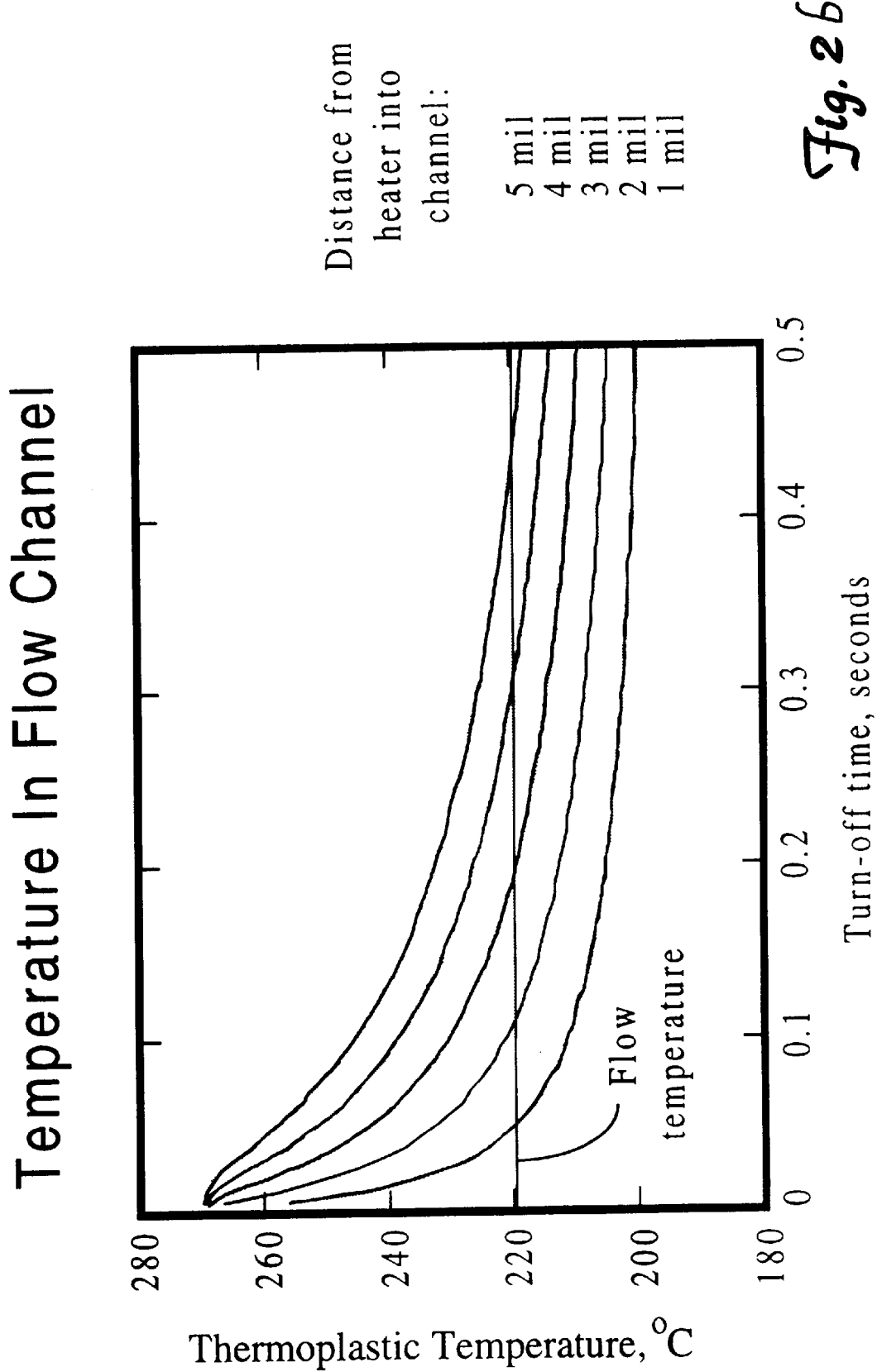
FIG. 2b is a graphic representation of the temperature profile in the flow channel of a thermoplastic extrusion apparatus according to the first thermal valve embodiment, with the heater turned off at t=0 seconds.

FIGS. 2a and 2b illustrate temperature profiles in stationary thermoplastic for the thermal valve of the first embodiment based on one-dimensional heat flow in a semi-infinite solid. Time is plotted along the horizontal axis, and temperature in the flow channel is plotted along the vertical axis. It is assumed here that the body 2 has the same thermal properties as the thermoplastic. In FIG. 2a, at time zero the thermoplastic and the insulating material 2 are at 180° C. and the heater 6 is turned on. In FIG. 2b, at time zero, the thermoplastic and the insulating material 2 are at 270° C. and the heater 6 is turned off. The temperature profile in the flow channel is shown in both figures at distances of 1 mil, 2 mils, 3 mils, 4 mils and 5 mils from the heater. In both cases, the thermoplastic in the immediate vicinity of the heater/heat sink combination has the most rapid initial temperature change.

EXAMPLE 3

Figure 2C:
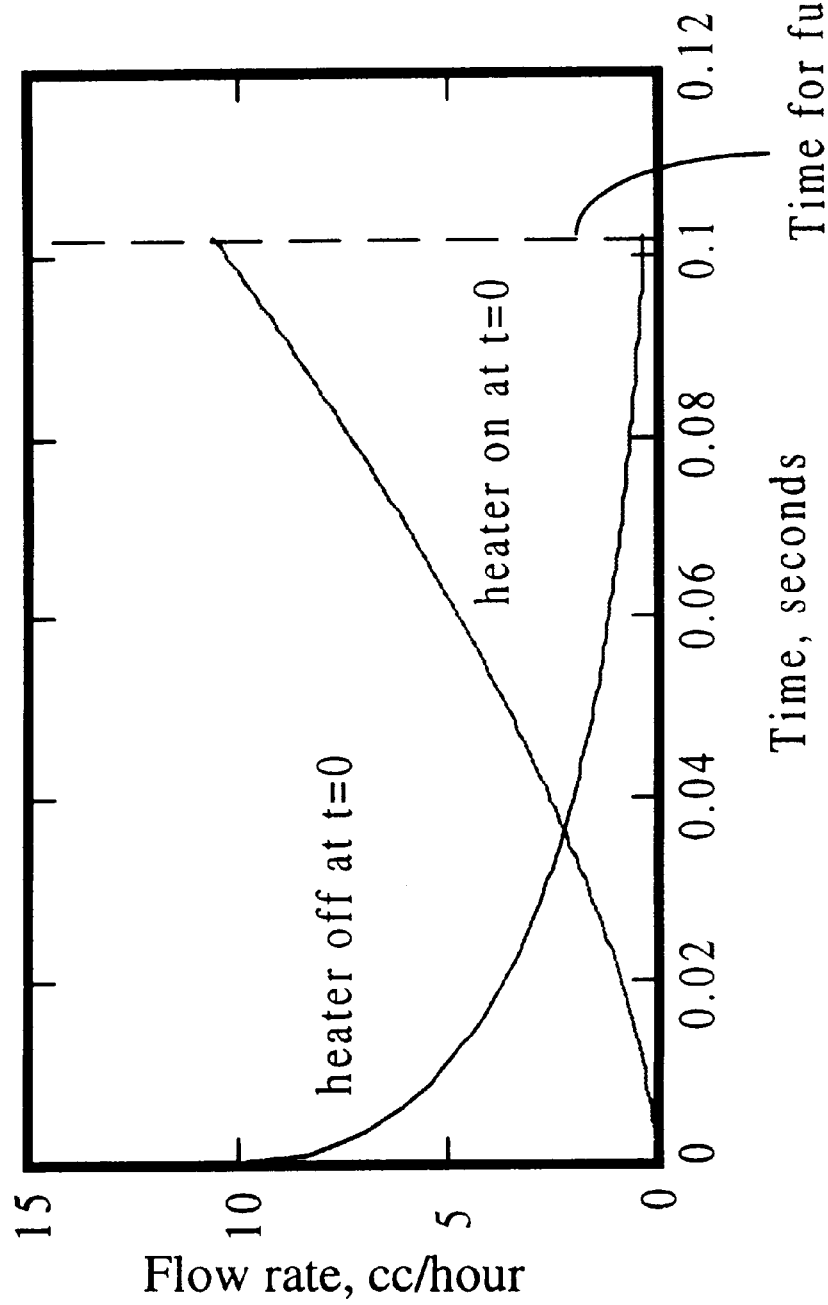
FIG. 2c is a graphical representation of the flow rate in a thermoplastic extrusion apparatus according to the first thermal valve embodiment, in the case of the heater turned off at t=0 and in the case of the heater turned on at t=0.
Figure 2D:
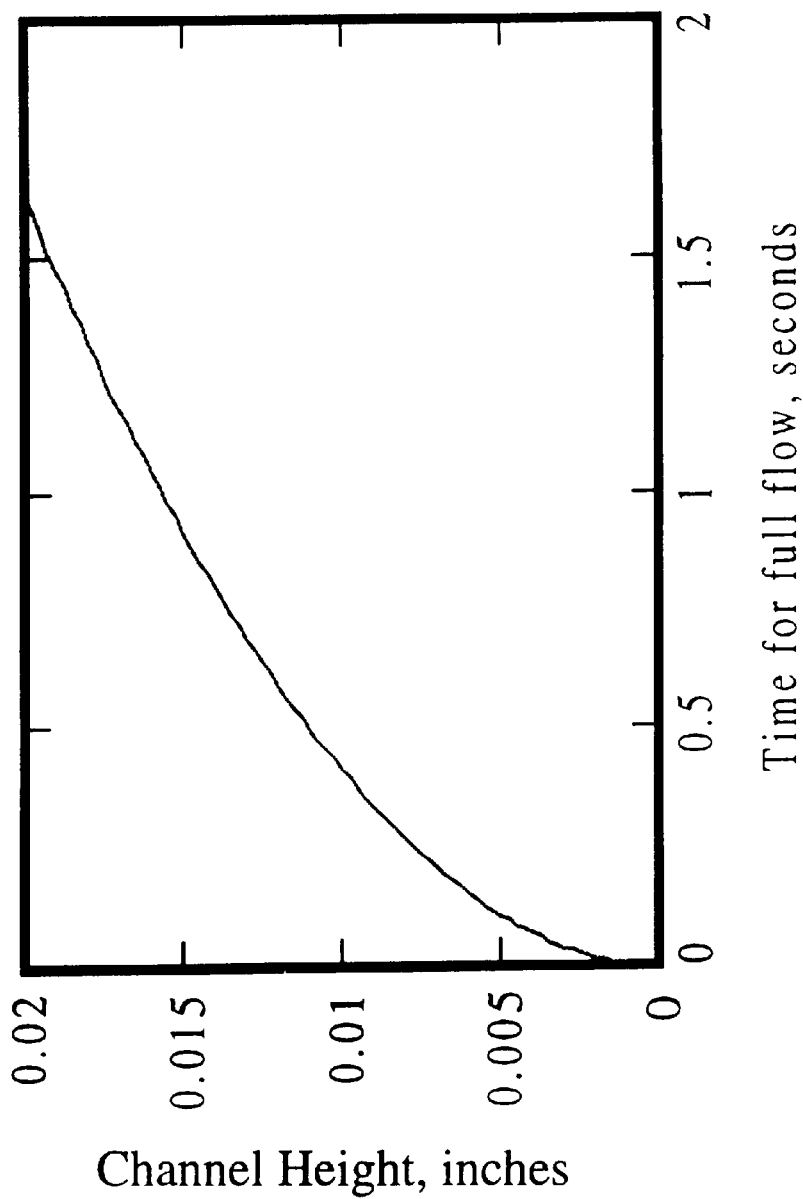
FIG. 2d is a graphical representation of the switching time for a thermoplastic extrusion apparatus according to the first embodiment of a thermal valve as a function of the flow channel size.

An example is provided in FIGS. 2c and 2d of the flow rate and switching time, respectively, for a hypothetical thermoplastic that abruptly changes from infinite viscosity to 500 Poise at 220° C. The volumetric flow rate through a channel varies with the cube of the height of the channel, $d_c^3$. A pressure of 500 psi is applied to drive this thermoplastic through the thermal valve embodiment shown in FIGS. 1a and 1b having the dimensions given in Example 1. FIG. 2c shows the flow rate time evolution as the channel is valved on and valved off. As shown, the channel valves off more quickly than it valves on, and the channel takes 0.1 seconds to fully open. FIG. 2d charts the time for the channel to fully open, as a function of the height of the flow channel 4. The switching time quickly increases to more than a second at a relatively modest channel dimension of 15 mils.

A real thermoplastic will have a gradual change in viscosity with temperature characteristic, slowing the response times from those of Example 3. Additionally, a flowing thermoplastic will carry heat into and create pressure in region 14, which was not accounted for in Example 3, thus decreasing the switch-on time and increasing the switch-off time. The thermal valve switch-on time (i.e., time from valve closed to valve open) will be somewhat shorter than the hypothetical switch-on time, and the switch-off time (i.e., time from valve open to valve closed) will be longer.

A momentary over-drive and under-drive technique can be used to improve the flow rate time response. The rate of opening can be increased by momentarily producing substantially more heat from the heater 6 than is required to achieve the desired steady state increasing flow rate. Similarly, the rate of closing can be increased by momentarily reducing or eliminating the amount of heat generated by the heater 6 that is required to achieve the desired steady state decreasing flow rate.

FIG. 3 shows a second embodiment of a thermal valve of the present invention, in which the heater 6, resistor 12 and heat sink 8 each comprise two elements, mirrored on opposite sides of the flow channel 4. The amount of heat absorbed and generated in this embodiment increases over that of the first embodiment, thereby increasing the response time of the thermal valve 14 for a given channel height. If the height of the channel $d_c$ for FIG. 3 is twice that for FIGS. 1a and 1b, the switching time for the thermal valve of FIG. 3 will be equal to that of FIGS. 1a and 1b, while the flow rate will be increased eight-fold (since the volumetric flow varies as $d_c^3$). For the embodiment of FIG. 3, the calculated switch-on time associated with $d_c$=2 mils is 4 milliseconds. (One-dimensional heat diffusion into a slab, as described in H. S. Carslaw and J. C. Jaeger, *Conduction of Heat in Solids*, Oxford, 1959).

Geometric constraints are imposed on the flow channel so that a thermal valve will switch from open to closed and from closed to open in a time useful for thermoplastic extrusion. It is difficult to filter most viscous thermoplastics to eliminate impurities smaller than about 2 mils. For rapid prototyping applications, as a practical matter it is necessary for an extrusion head to deposit material at a linear speed of at least about 0.1 inches per second, and to have a 50 mil resolution of object features along the direction of travel. The maximum switch-on time for a thermal valve of the present invention for rapid prototyping applications is thus about 500 milliseconds. Taking the embodiment of FIG. 3, the calculated channel height associated with a 500 milliseconds switch-on time is $d_c$=22 mils. Accordingly, for rapid prototyping applications, it is desirable that the flow channel be between 2 mils and 22 mils high.

FIG. 4 shows a third embodiment of a thermal valve of the present invention in which the heater 6 and the heat sink 8 straddle the flow channel 4. An advantage of this configuration is that the thermal resistor 12 is eliminated, with the thermoplastic acting as a thermal resistor. The switch-off time for this configuration is shorter than that of the FIGS. 1a and 1b configuration with the same component dimensions, but the turn on time is longer.

Figure 5A:
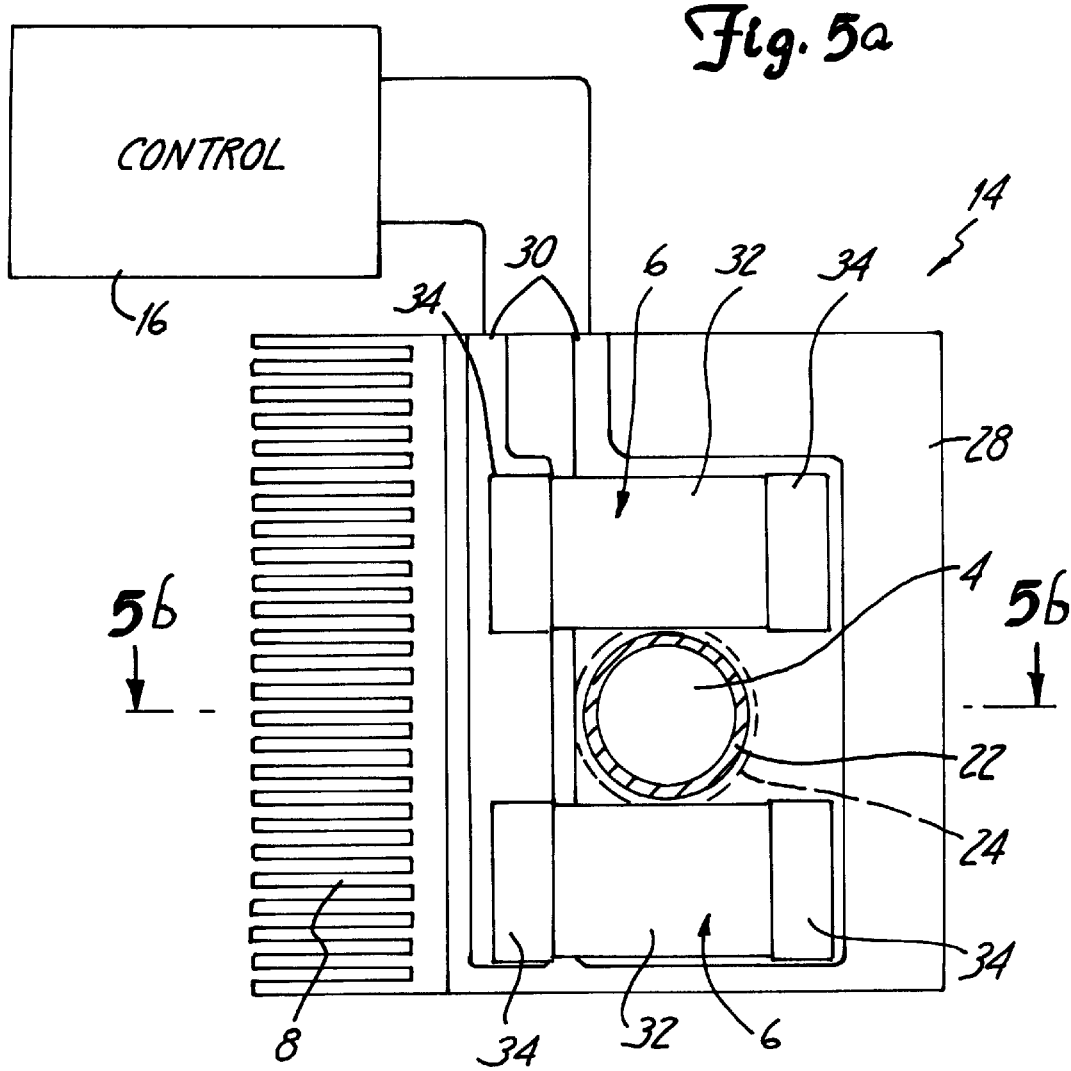
FIG. 5a is a sectional view of a fourth embodiment of a thermal valve of the present invention, utilizing printed circuit board technology.
Figure 5B:
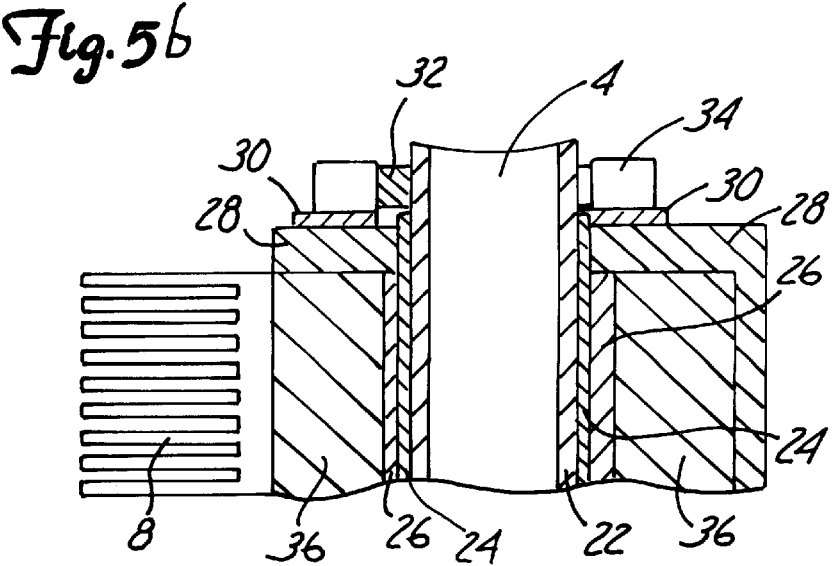
Figure 5C:
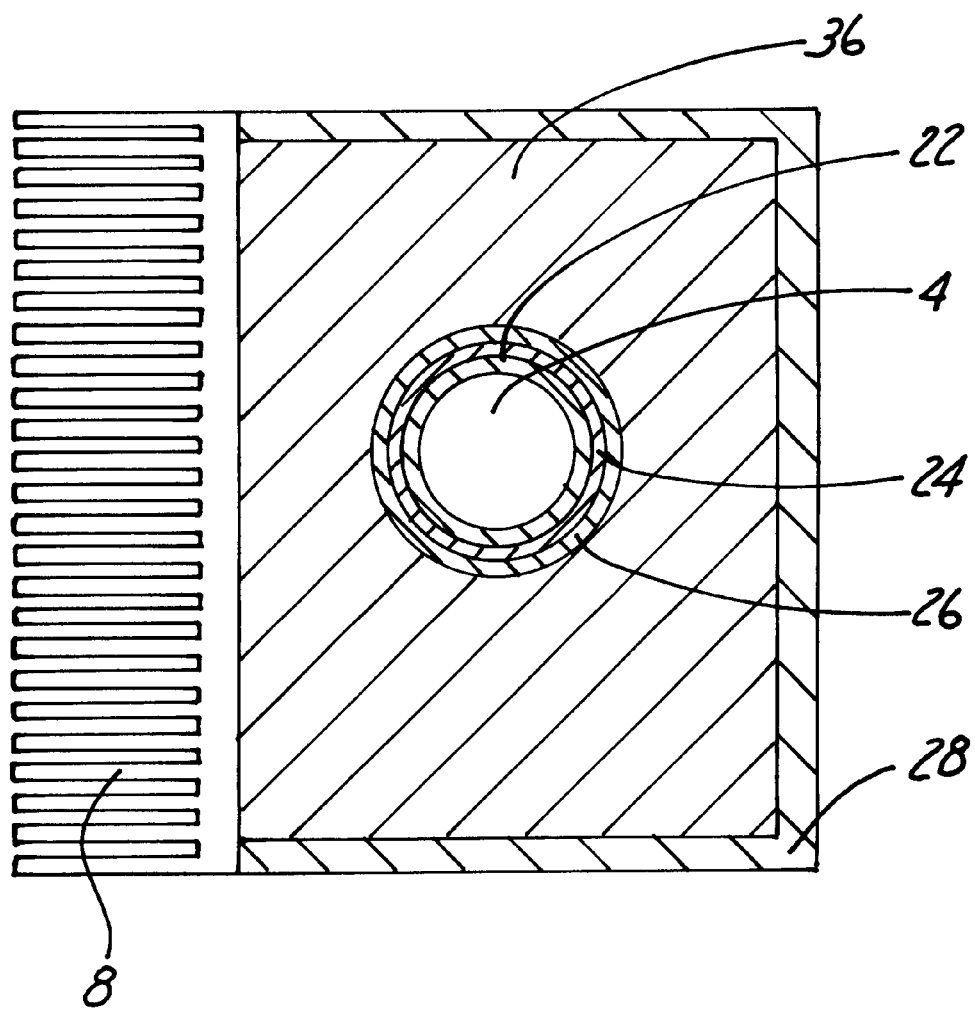
FIG. 5c is a sectional view of the fourth embodiment of a thermal valve of the present invention, as seen from the bottom of FIG. 5b.

FIGS. 5a–5c show a fourth embodiment of a thermal valve of the present invention implemented in a manner analogous to a printed circuit board. Thermal valve 14 comprises a cooling block 36 surrounded on three sides and a top portion by an insulator 28 and contacting the heat sink 8 on a fourth side. A thermally conducting hollow cylinder 24 containing a fitted tube 22 extend through the cooling block 36 and define the flow channel 4. The cylinder 24 is preferably formed of a stack of copper pads with co-axial plated-through holes; this configuration in a printed circuit board is a via. The tube 22 forms the outside walls of flow channel 4, and can be any thermal conductor. Thin-wall stainless steel is particularly suitable. The tube 22 is not necessary, however, it helps to seal the channel 4 and can be used to define the nozzle. A top end of the thermally conducting cylinder 24 extends past the top of cooling block 36 and connects to two conductive pads 30, supported on insulator 28. The pads 30 are preferably copper films formed by standard printed circuit lithography, etching and plating techniques. The insulator 28 is made of a thermally insulating material, such as glass-filled epoxy laminate. Heater 6, comprised of two heating elements formed by a surface mount resistor 32 having two metalized contacts 34, is mounted in thermal and electrical contact with conductive pads 30. While two heating elements are shown in FIGS. 5a and 5b, use of one to four heating elements is preferred and any number may be used. The conductive pads 30 carry heat from heater 6 to the flow channel 4 and carry electrical signals from the control 16 to the heater 6. A cylindrical spacer 26, made of thermally insulating material, isolates the cylinder 24 from the cooling block 36. The cooling block 36 is preferably metallic, and is preferably copper. The heat sink 8 maintains the cooling plate below the highest non-flowing temperature of the thermoplastic. If desired, feedback on the temperature in the flow channel 4 can be provided by temperature sensors. A convenient method for detecting the temperature of the embodiment shown in FIGS. 5a–5c is to detect the temperature dependent resistance of the surface mount resistors 32. Advantages of this embodiment are that it uses existing design tools and embedded control circuitry, patterns may be laid out lithographically, and heat diffusion is two-dimensional.

Figure 6A:
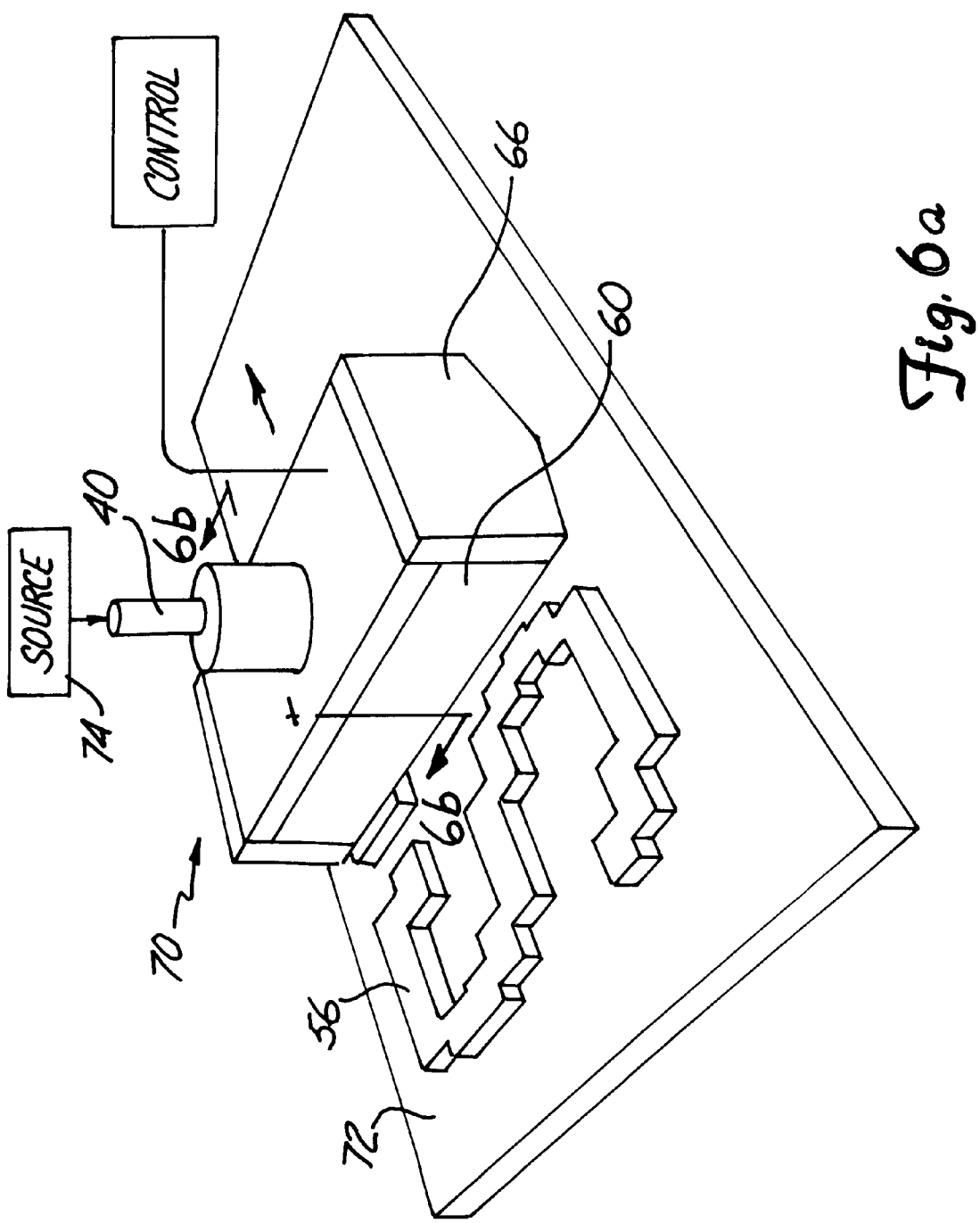
FIG. 6a is a perspective view of an apparatus according to the present invention in a build state, showing an extrusion head containing a thermal valve array.
Figure 6B:
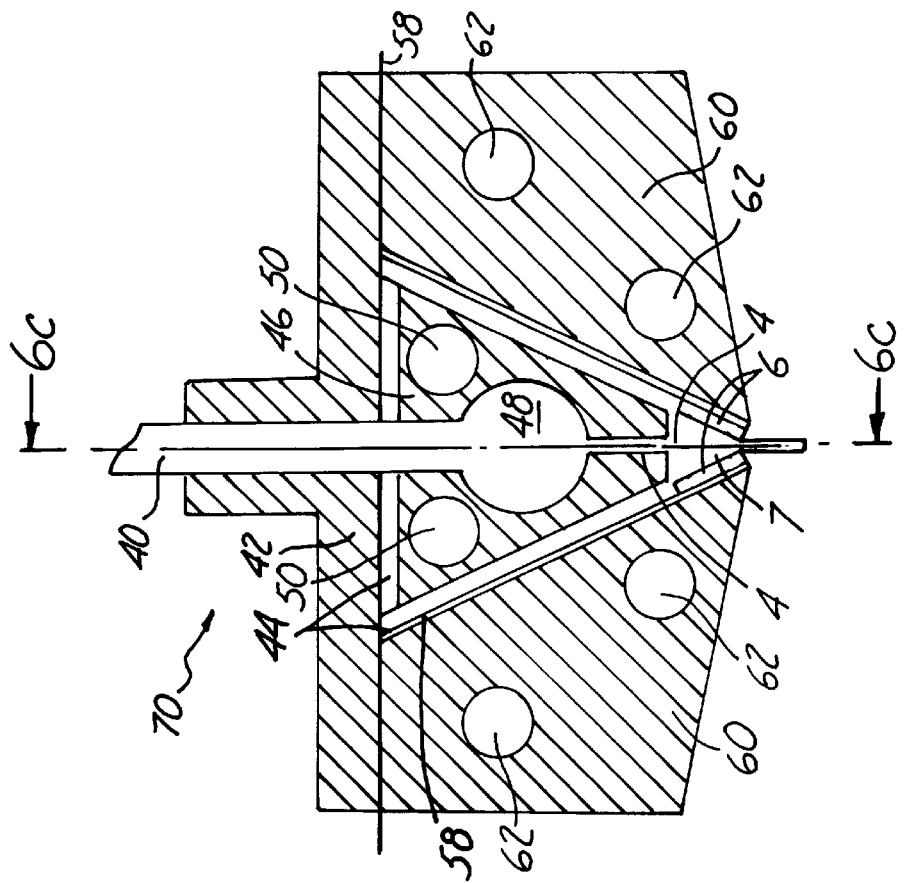
Figure 6C:
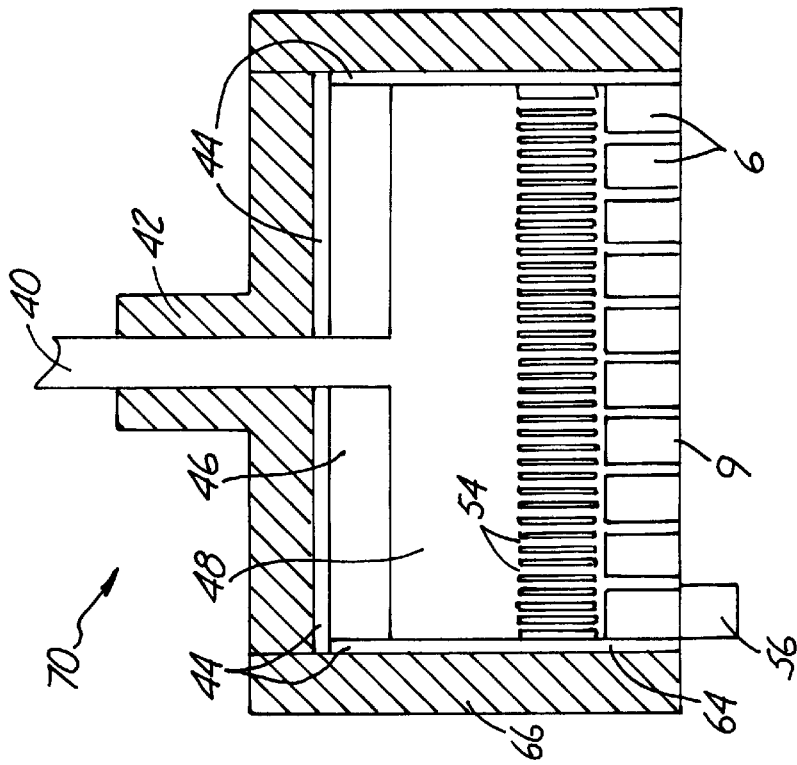

FIGS. 6a–6c show an extrusion head 70 according to the present invention formed of an array of thermal valves configured to provide a varying extrudate configuration 56. FIG. 6a shows thermoplastic material 40 forced into the extrusion head 70 from a source 74 as the extrusion head 70 is moved in a predetermined spatial pattern (according to methods known in the art) with respect to a base 72. Electrical signals from the control 16 synchronize activation and deactivation of heaters 6 with the motion between the extrusion head 70 and the base 72, causing extrusion of thermoplastic 40 in extrudate configuration 56, such as shown in FIGS. 6b and 6c. Extrudate can be applied over or adjacent to previously extruded material, as well as directly onto the base 72. In this manner, extrusion head 70 is used to make patterns, features or physical object 74 rapidly and with high resolution.

The body of extrusion head 70 is formed of two cooled jaws 60 having opposing interior faces mounted in a "V" formation with a small gap therebetween, a heated keel 46 positioned between the jaws 60, a heated sleeve 42 mounted on top of the jaws 60, and endplates 66 attached at opposite ends of jaws 60. A pair of flex circuit boards 58 (FIG. 6b), which act as thermal insulators, line the interior faces of jaws 60 and extend to exterior edges of jaws 60. Thermally insulating material 44 isolates the heated keel 46 from the cooled jaws 60 and endplates 66. Heaters 6 are mounted on the circuit boards 58 at the bottom edges of the interior faces of jaws 60, creating an array of thermal valves and defining an elongated nozzle 7 having an orifice 9 shaped as an elongated slot. Heaters 6 are preferably formed by a pair of opposing surface mount resisting having metalized contacts (shown in FIG. 5a). Jaws 60 are chilled by cooling channels 62 carrying flowing water or other coolant, and act as a heat sink. Heated sleeve 42 provides pressurized and flowable thermoplastic to keel 46, heated by two heaters 50. Plenum 48, a large lateral passageway within keel 46, distributes flowable thermoplastic to the flow channel 4, formed of nozzle 7 and an array of narrow channels 54 within keel 46 leading thereto. Channels 54 are flow regulators, delivering nearly the same pressure of thermoplastic along the nozzle 7 independent of the instantaneous extrudate configuration. The keel 46 maintains a constant pressure source of thermoplastic along the length of the plenum 48 independent of where thermoplastic is flowing in the elongated nozzle; the pressure drop for thermoplastic material passing through the channels 54 is designed to be larger than the largest pressure drop that can occur along the length of the plenum 48.

The extrusion head 70 of FIGS. 6a–6c has ten heaters 6; each pair of heating elements straddling a different section of the nozzle 7. A thermal valve of the embodiment shown in FIG. 3 is created by each of the ten heaters 6, together forming an array of thermal valves in parallel. Each heater 6 is individually controlled to activate and deactivate independently, thereby selectively opening and closing portions of the nozzle 7. If only the leftmost heater 6 of FIG. 6c is activated, then the thermoplastic is flowable through the nozzle 7 only at that location, thereby producing extrusion configuration 56 corresponding to the geometry of the nozzle orifice adjoining the leftmost heater 6.

For some applications, it is desirable to have multiple thermal valves in series along a flow channel. For example, if the latent heat of the thermoplastic is sufficiently low, valving-off the flow channel may result in the thermoplastic being nearly solid when it comes in contact with the base 72 or with previously extruded material. In such a case, a solid bridge of thermoplastic tends to form from the previously extruded material, through the newly extruded and solidified thermoplastic, to solidified thermoplastic in the flow channel 4. This solid bridge can immobilize the extrusion head 70 with respect to the base 72. Adding a downstream thermal valve near the orifice 9 can prevent formation of a solid thermoplastic bridge.

Figure 8:
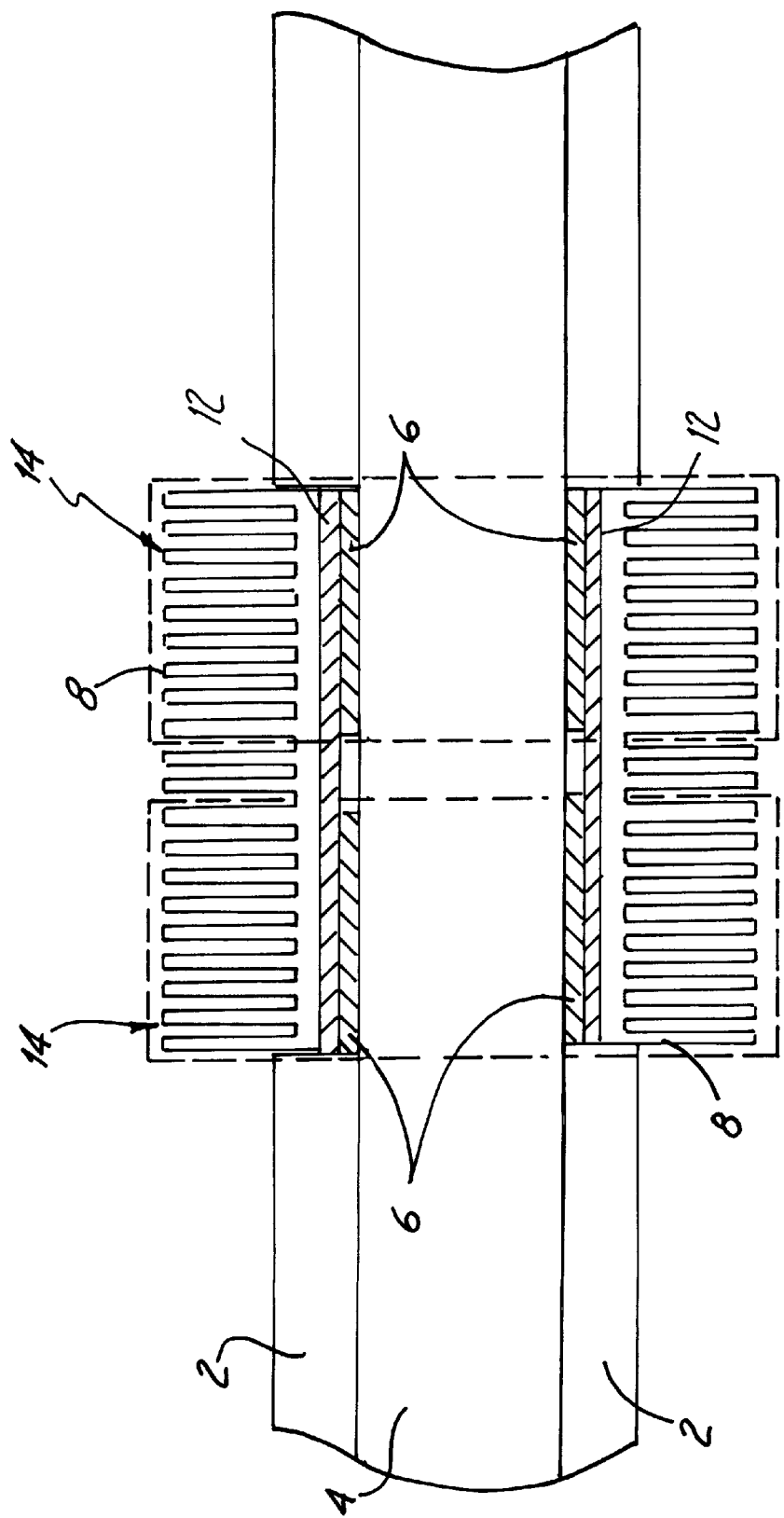
FIG. 8 is a sectional view of an extension of the second embodiment of a thermal valve to two thermal valves in series.

An extension of the thermal valve embodiment of FIG. 3 to two thermal valves in series is shown in FIG. 8. An upstream and a downstream heater 6 create two sequential valves 14 in the flow channel 4. As shown, a single heat sink 8 and resistor 12 (each having two opposing elements) straddle the two heaters 6. Alternatively, two separate heat sinks 8 and resistors 12 may be used. To prevent formation of a solid thermoplastic bridge, the downstream valve, placed near the orifice 9, is maintained open while the upstream valve is closed. The downstream valve is closed when extrusion will cease for a time substantially longer than the switching time. A fast switching upstream valve may be used with a slower response downstream valve that can seal against creep. Thermal valves in series may also be used to vary orifice size, while gating the flow. The upstream valve gates flow while the downstream valve sets orifice size.

Figure 9:
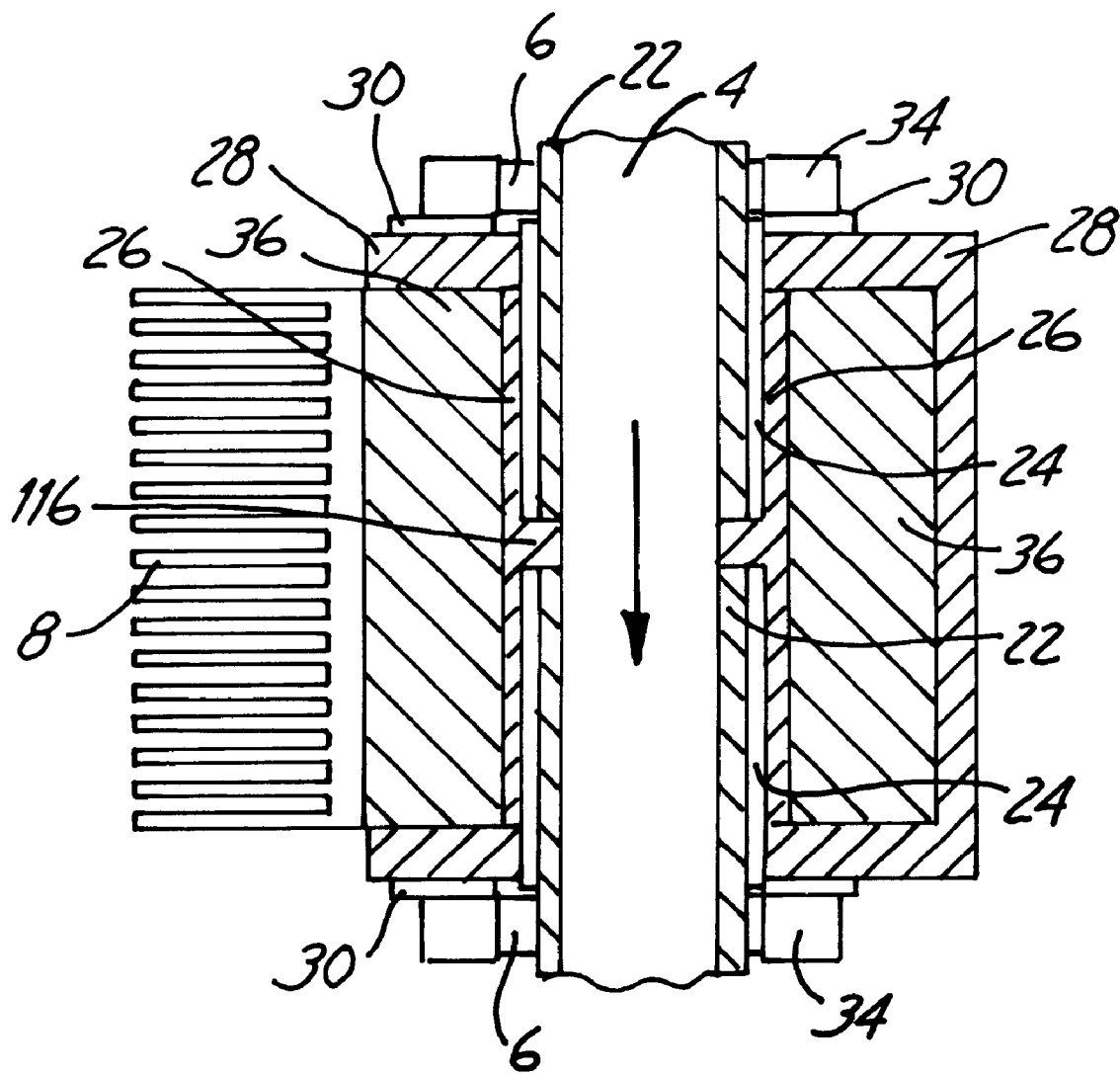
FIG. 9 is a sectional view of an extension of the fourth embodiment of a thermal valve to two valves in series.

FIG. 9 shows an embodiment of a series configuration of thermal valves as an extension of the printed circuit board technology of FIGS. 5a–5c. An upstream tube 22 and a downstream tube 22, each having an associated thermally conducting cylinder 24, define two valve regions in flow channel 4. The top of the upstream thermally conducting cylinder 24 connects to an upstream pair of conductive pads 30, and the bottom of the downstream thermally conducting cylinder 24 connects to a downstream pair of conductive pads 30. Each pair of conductive pads 30 has a heater 6, comprising a pair of heating elements mounted thereon. A gap 116 between the upstream and downstream thermally conducting cylinders 24 and tubing 22 is filled with insulating material 28, providing thermal isolation between the two valves.

Figure 10B:
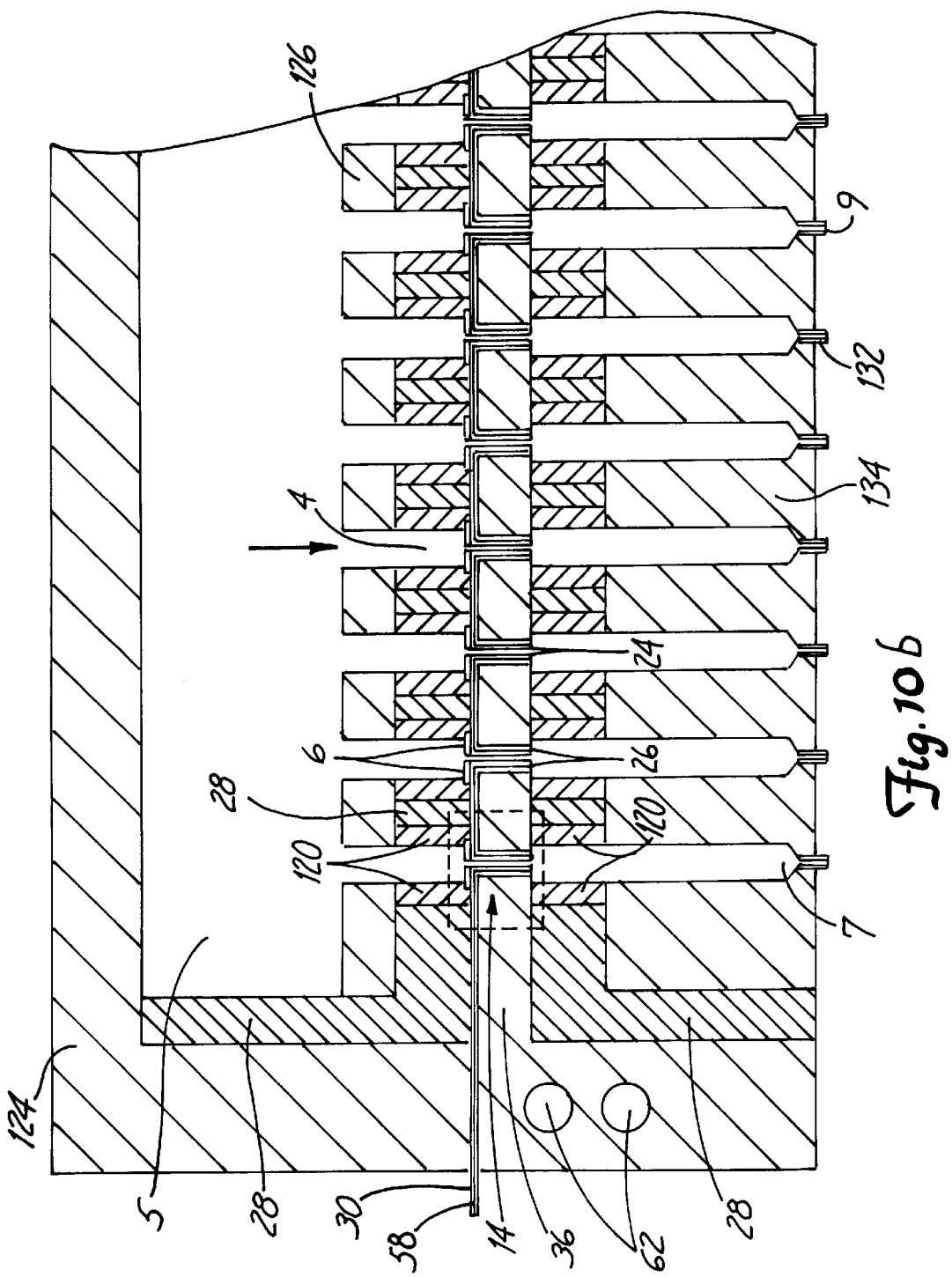

FIGS. 10a and 10b show an extrusion head 70 formed by a two-dimensional array of 104 thermal valves in parallel, based on the printed circuit board technology of FIGS. 5a–5c. The orifice diameter and relative positions are chosen so that a single pass of the array over a region (traversing vertically as the array is oriented in FIG. 10a) can solidly fill a region with a layer of thermoplastic. For orifices 9 having an inner diameter of 13 mils and a deposited road of 15 mils wide and 10 mils high per nozzle, the array would span 1.6 inches and would deposit at a peak rate of about a pint of thermoplastic per hour at an inch per second velocity. A redundant orifice configuration (e.g., in FIG. 10a, a second array displaced a small distance vertically on the page from the existing first array) could be added to allow continued extrusion with a partially clogged first array, given a mechanism to detect clogging in the orifices.

FIG. 10b shows the left most eight valves and orifices, viewed along the section 10b—10b of FIG. 10a. An upper housing 124 having a horizontal top section and four vertical walls, cooling block 36 mounted beneath the walls of housing 124, a bottom heated steel plate 134 and insulating material 28 form the body of extrusion head 70. Insulating material 28 lines the walls of housing 124, separates a lower face of cooling block 36 from steel plate 134 and separates an upper face of cooling block 36 from a heated keel plate 126. Space in the housing 124 above keel plate 126 forms the plenum 5. The 104 flow channels 4 each extend from plenum 5 through keel plate 126, through cooling block 36 and through steel plate 134. Near the bottom surface of steel plate 134, the flow channels 4 each terminate in an associated nozzle 7. Additionally, each flow channel 4 has an upstream and a downstream cylindrical spacer 120. The upstream cylindrical spacer extends from the keel plate 126 to the cooling block 136, and the downstream cylindrical spacer extends from the cooling block 36 to the steel plate 134. Spacers 120 form the portion of the flow channels leading to and from the thermal valves 14, which valves are located along the flow channels where the flow channels pass through the cooling block 36. Polytetra-fluoroethylene washers may be used as the cylindrical spacers 120. The flow channels 4 are preferably constricted at the position of the thermal valves 14, to decrease the response time of the valves. The relatively larger diameter of other portions of the flow channels 4 maintain a desired low pressure drop through the channels.

Circuit board 58, mounted on top of cooling block 36, carries contact pads 30. Contact pads 30 and circuit board 58 exit the side of the housing 124 to allow electrical connection with external drive and sensing circuits. In the absence of heat generated by heaters 6 (i.e., pairs of opposing resistors 32 placed on contact pads 30), the thermal valves are cooled by cooling block 36 to a temperature below the highest non-flowing temperature of the thermoplastic.

A section of tubing 132 is swaged into each nozzle 7 in the steel plate 134, thereby defining the orifices 9. The housing 124 and the heated steel plate 134 should be rigid enough not to experience significant distortion when the plenum 5 is pressurized to several hundred psi.

Figure 7:
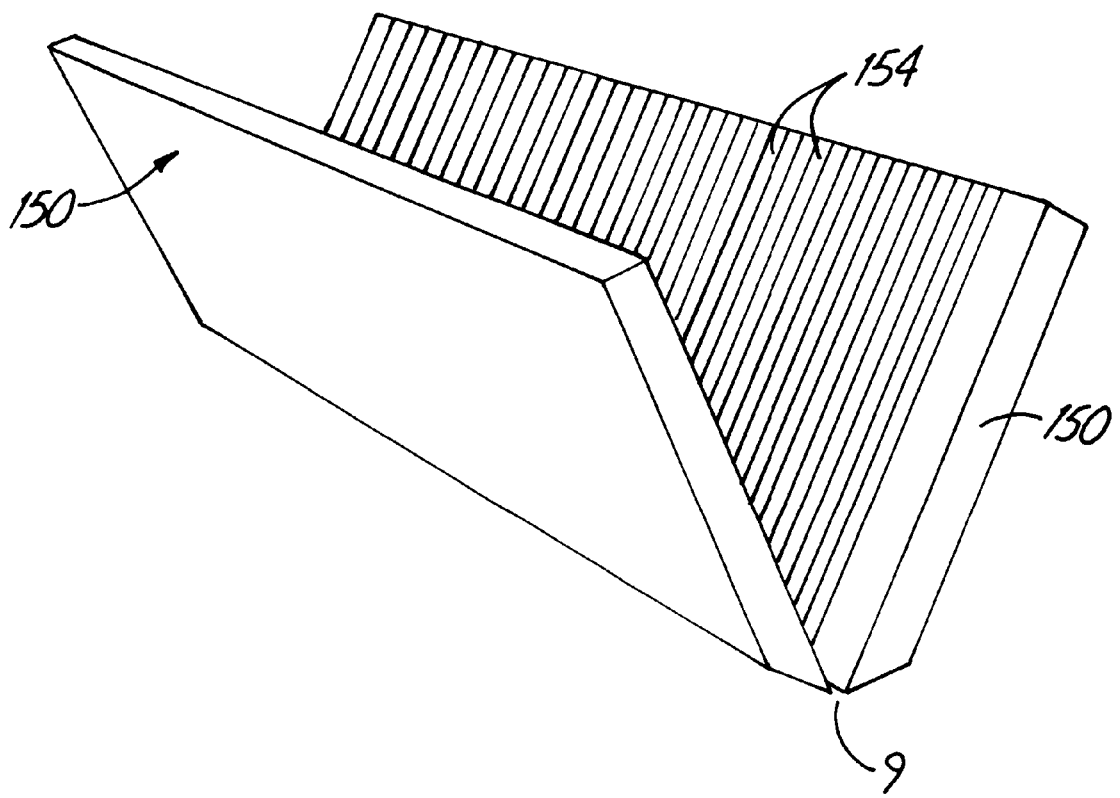
FIG. 7 is a perspective view of an alternate thermal valve array according to the present invention, for use in an extrusion head such as shown in FIGS. 6a–6c.

FIG. 7 shows an alternate thermal valve array for use in an extrusion head 70 such as shown in FIGS. 6a–6c. Heaters 6 are integrated into two silicon chips 150. The chips 150 mounted in "v"-formation with a gap between their bottom inside edges create a nozzle region having an orifice 9 in the shape of a slot. The bottom outside edges of the chips 150 are ground to make the orifice 9 the lowest point of the assembly. Conductors 154 implanted into or deposited on the silicon chips 150 carry signals to the nozzle region, where heaters 6 (e.g., pairs of diodes, resistors or transistors) convert the signals to heat. The thermal conductivity and thickness of the silicon chips 150 are selected so that the silicon acts as a thermal resistor. The silicon chips 150 are thus suitable for mounting directly onto heat sinks. An advantage of this design is that it can be made spatially dense. Another advantage is that additional circuitry, such as temperature sensors and signal de-multiplexers, can be included in the silicon chips without a significant cost increase.

In order to utilize the high deposition rates of which an extrusion head having an array of thermal valves is capable, the extrusion head must be supplied with high flow rate sources of pressurized liquified thermoplastic. The thermoplastic source should not liquify more thermoplastic than will be used in a relatively short time, due to the finite pot life typical of most thermoplastics.

Figure 11:
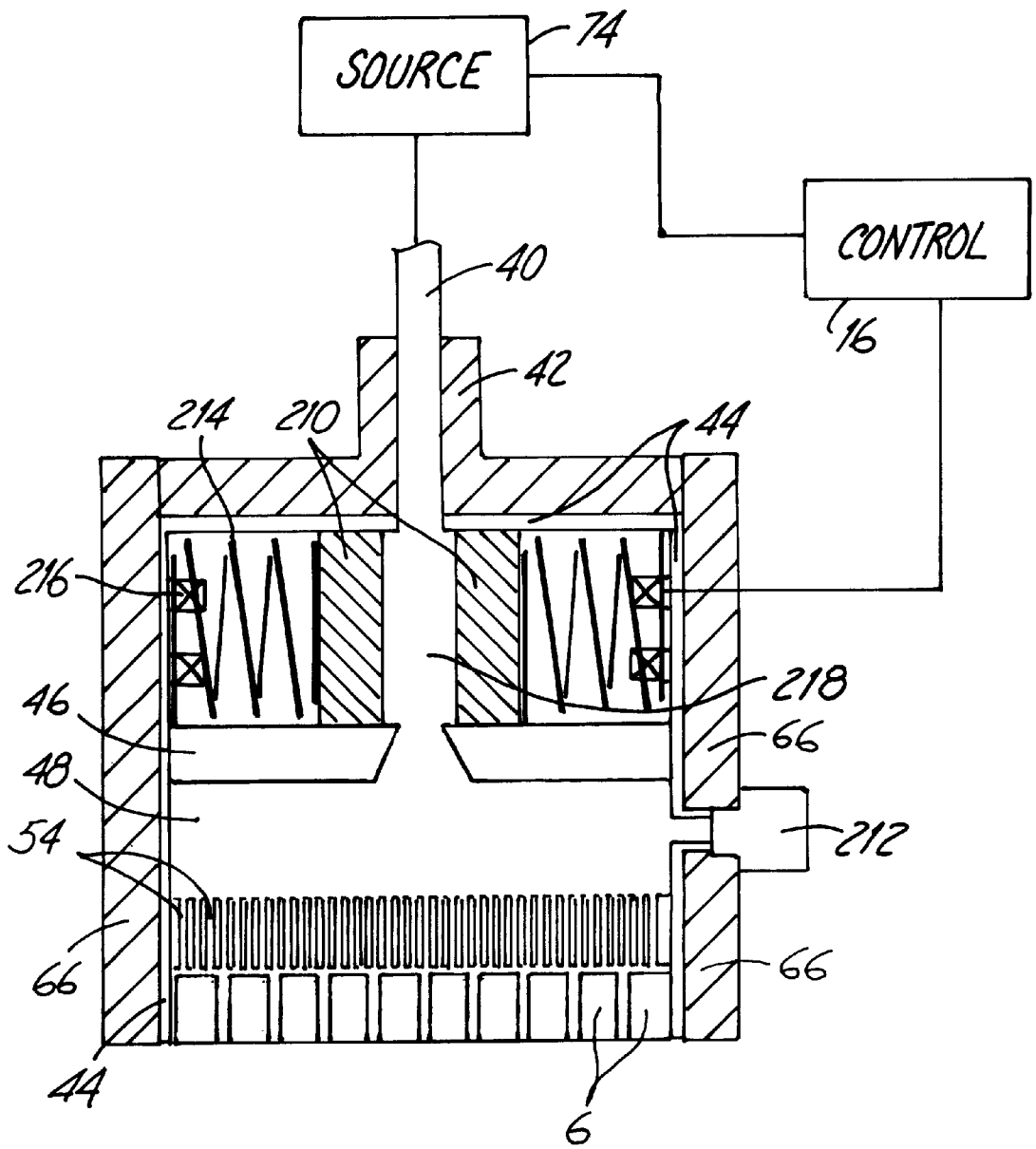
FIG. 11 is a sectional view of an alternative embodiment of the extrusion head of FIGS. 6b and 6c, modified to accommodate sudden changes in pressure.

The embodiment of FIG. 11 addresses potential problems of sudden increases and decreases in pressure in an extrusion head of the present invention. Solidified thermoplastic generally expands as it is heated. Temperature increases without a corresponding release of pressure could therefore cause the extrusion head to become destructively over-pressurized. For example, at a transition between rapidly extruding along the length of the nozzle as solid thermoplastic is rapidly fed into the extrusion assembly, to not extruding at all, the relatively colder thermoplastic in the extrusion assembly will expand as it is heated. This effect is amplified by absorbed materials in the thermoplastic, such as water, which will vigorously expand as the thermoplastic is heated. The generation of gas by water in the extrusion assembly poses the converse concern that a gas pocket will exit suddenly out of the nozzle, creating a pressure drop. Unless the thermoplastic feed mechanism can supply additional material to quickly refill the extrusion assembly with thermoplastic, the pressure drop will result in an incorrect extrudate configuration.

In FIG. 11, the extrusion head 70 of FIG. 6a is modified to include a pressure regulator. Thermoplastic 40 is forced into the heated sleeve 42 by thermoplastic source 74 under the control of control 16, generating pressurized and flowable thermoplastic. The pressurized thermoplastic flows into a chamber 218 created between two accumulator pistons 210. The accumulator pistons 210 are forced towards each other by a pair of opposing springs 214. Two sets of magnetic sense coils 216 monitor the lateral positions of the pistons 210, providing pressure feedback information to the control 16. Thermoplastic flows from the chamber 218 into the plenum 48 of keel 46. In the event that the pressure feedback indicates that pressure in the extrusion head is excessive, a relief valve 212 located in plenum 48 opens and releases thermoplastic into the ambient environment. The relief valve 212 can be a spring-loaded ball valve or other apparatus well known to those skilled in the art. Also, the spring-operated accumulator pistons 210 can be replaced with a sealed gas bellows, a bladder, or other accumulator design well known to those skilled in the art. Since most engineering plastics thermally degrade with exposure to heat, it is desirable that the accumulator not have pockets or crevices that retain thermoplastic for long periods of time.

Figure 12A:
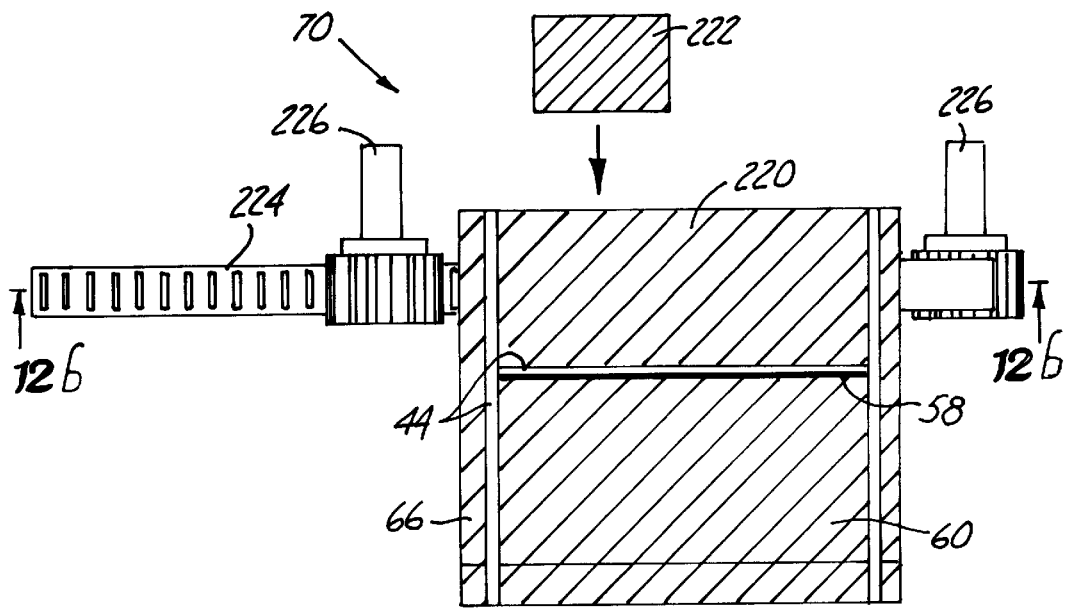
FIG. 12a is an exterior side view of an extrusion head such as shown in FIGS. 6b and 6c, modified to include a source of thermoplastic under pressure.
Figure 12B:
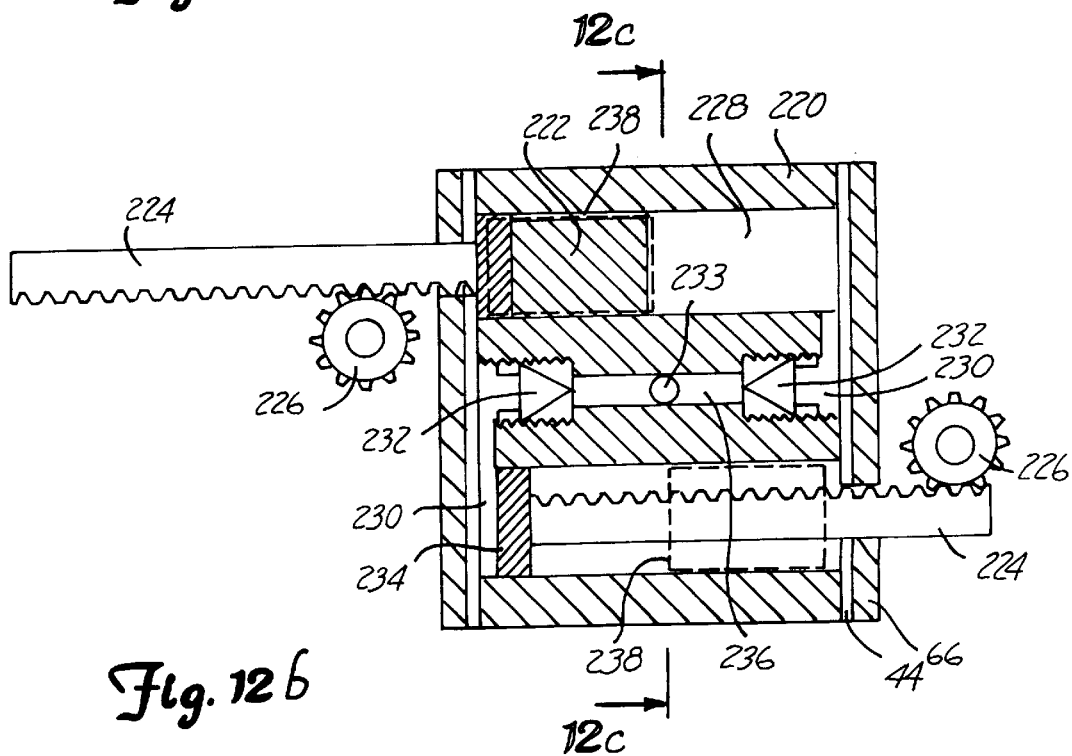
Figure 12C:
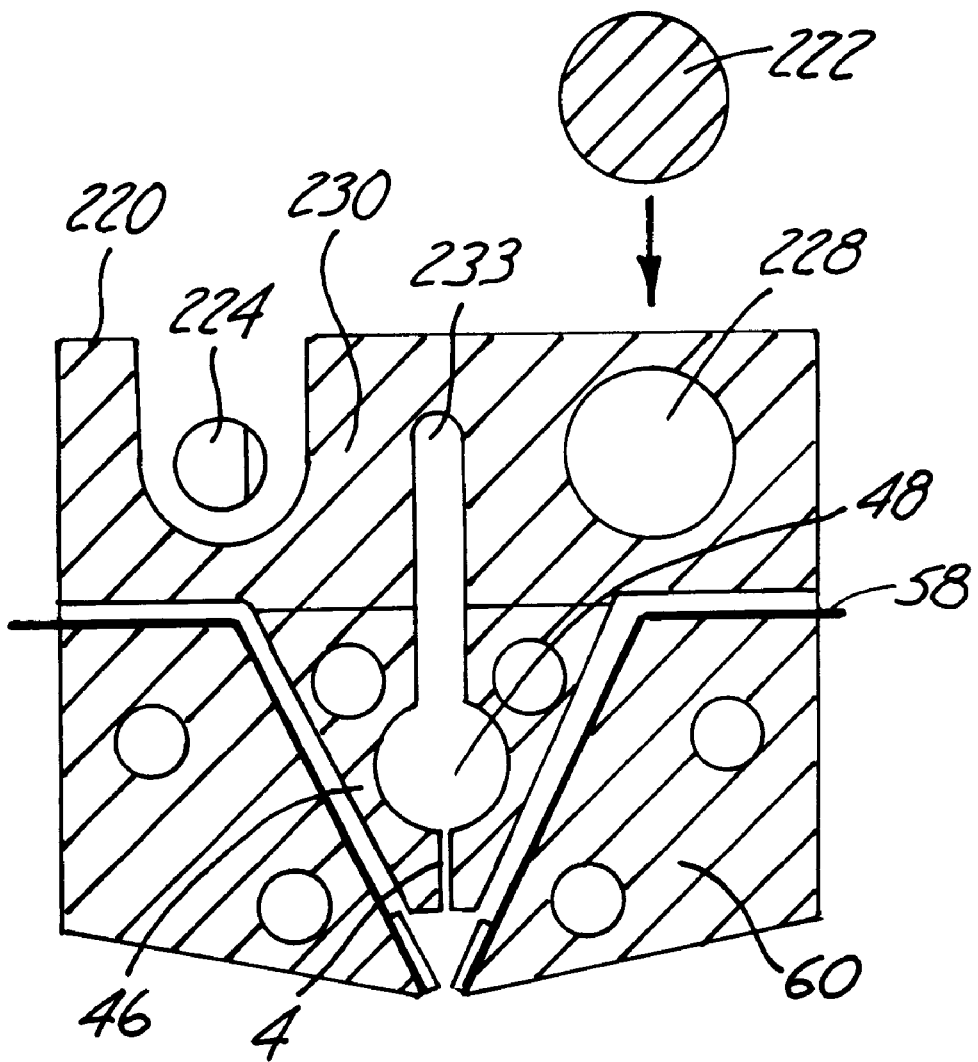

FIGS. 12a through 12c show the extrusion head 70 of FIGS. 6b and 6c modified to include one possible source 74 of thermoplastic under pressure, using motors to actively regulate pressure. A heated housing 220 has two access ports 238, each leading to a heated chamber 228. Each access port 238 has an associated piston 234 and a driveshaft 224 driven by a rack gear 226 and a remote motor. Access ports 238 receive cylindrical slugs of solid thermoplastic 222. One of the pistons 234 motor drives the slug into the heated chamber 228, where the slug 222 is liquified by thermal contact with the heated housing 220. The heated housing 220 further has two flow channels 230 which connect each heated chamber 228 to an associated one-way valve 232. The one-way valves lead to a single feed channel 233 within housing 220. Once the slug 222 is partially liquified, the piston is advanced by the remote motor, forcing pressurized thermoplastic through one of the flow channels 230, through the associated one-way valve 232, and into the feed channel 233. The feed channel 233 terminates in plenum 48. Torque required from the motor to advance the pistons 234 is used to control the pressure of the thermoplastic; in this manner thermoplastic can advance either quickly or slowly into the plenum 48, depending on how many thermal valves are open at a given time. Several of these piston assemblies can be mounted over the extrusion head in order that thermoplastic slugs can simultaneously be heating in some and delivered as pressurized fluid from others.

The disclosed thermoplastic extrusion apparatus and method have applicability outside of rapid prototyping. For example, apparatus of the present invention can be used to deposit patterns of thermoplastic solder paste on circuit boards, or to dispense patterns of hot melt adhesive for assembly of clothing and other cloth articles.

Although the present invention has been described with reference to preferred embodiments, workers skilled in the art will recognize that changes may be made in form and detail without departing from the spirit and scope of the invention. It should be understood that while this description is made by way of preferred example, the invention is defined by the scope of the claims.

What is claimed is:

1. In a process for extruding thermoplastic through a nozzle and onto a base as the nozzle and the base are moved relative to each other in a predetermined spatial pattern, the nozzle being located in a downstream zone of a flow channel, the improvement comprising:

cooling a first valve region of the flow channel to a temperature below the lowest flowable temperature of the thermoplastic; and selectively heating the first valve region to a temperature at which the thermoplastic is flowable in synchronization with the relative movement of the base and the nozzle, thereby selectively allowing flow of thermoplastic through the first valve region and causing thermoplastic extrusion through the nozzle in a varying extrudate configuration.

2. The method of claim 1, wherein the step of selectively heating the first valve region includes generating heat at a level that causes thermoplastic in the first valve region to be partially flowable.

3. The method of claim 1 and further comprising:

cooling a second valve region of the flow channel, located upstream of the first valve region, to a temperature below the lowest flowable temperature of the thermoplastic;

selectively heating the second valve region to a temperature at which the thermoplastic is flowable, at times coordinated with the selective heating of the first valve region; and continuing to heat the first valve region for a limited time after ceasing to heat the second valve region, to prevent formation of a solid thermoplastic bridge from the nozzle to the base.

4. The method of claim 1 and further comprising:

cooling a second valve region of the flow channel, located upstream of the first valve region, to a temperature below the lowest flowable temperature of the thermoplastic;

selectively heating the second valve region to a temperature at which the thermoplastic is flowable, at times coordinated with the selective heating of the first valve region; and increasing the pressure of the thermoplastic extrusion by heating the second valve region at times when the first valve region is not being heated.

5. The method of claim 1 and further comprising:

depositing the extruded thermoplastic layer-by-layer on the base to form a three-dimensional object.

6. A method for varying the extrudate configuration of thermoplastic extruded onto a base, comprising:

providing an extrusion head containing a plurality of flow channels, each flow channel having a downstream nozzle zone, each nozzle zone having an orifice;

cooling a first valve region of each of the plurality of flow channels to a temperature below the lowest flowable temperature of the thermoplastic;

selectively and independently heating the first valve region of each of the plurality of flow channels to a temperature at which the thermoplastic is flowable while moving the extrusion head and the base relative to one another in a predetermined spatial pattern, thereby selectively allowing passage of the thermoplastic flow through the first valve regions and causing extrusion through the orifices in a varying extrudate configuration.

7. The method of claim 6 and further comprising:

depositing the extruded thermoplastic layer-by-layer on the base to form a three-dimensional object.

8. A method for varying the extrudate configuration of thermoplastic extruded onto a base, comprising:

providing an extrusion head containing a flow channel having a downstream nozzle zone, the nozzle zone having an elongated orifice and having distinct regions along the orifice;

cooling the nozzle zone of the flow channel to a temperature below the lowest flowable temperature of the thermoplastic; and selectively and independently heating the distinct regions of the nozzle zone to a temperature at which the thermoplastic is flowable while moving the extrusion head and the base relative to one another in a predetermined spatial pattern, thereby selectively allowing passage of the thermoplastic flow through the distinct regions and causing extrusion through the orifice in a varying extrudate configuration.

9. The method of claim 8 and further comprising:

depositing the extruded thermoplastic layer-by-layer on the base to form a three-dimensional object.

* * * * *